US009409710B2

(12) United States Patent
Shakes et al.

(10) Patent No.: US 9,409,710 B2
(45) Date of Patent: Aug. 9, 2016

(54) METHOD AND APPARATUS FOR MULTI-DESTINATION ITEM SELECTION USING MOTES

(71) Applicant: Amazon Technologies, Inc., Reno, NV (US)

(72) Inventors: Jonathan J. Shakes, Mercer Island, WA (US); François M. Rouaix, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 138 days.

(21) Appl. No.: 14/281,211

(22) Filed: May 19, 2014

(65) Prior Publication Data

US 2014/0257553 A1  Sep. 11, 2014

Related U.S. Application Data

(62) Division of application No. 11/077,430, filed on Mar. 10, 2005, now Pat. No. 8,731,708.

(51) Int. Cl.
*G06F 7/00* (2006.01)
*B65G 1/137* (2006.01)
*G06Q 10/08* (2012.01)

(52) U.S. Cl.
CPC .............. *B65G 1/1373* (2013.01); *G06Q 10/08* (2013.01)

(58) Field of Classification Search
None
See application file for complete search history.

(56) References Cited

U.S. PATENT DOCUMENTS

| 5,646,616 | A | 7/1997 | Komatsu |
| 5,781,443 | A | 7/1998 | Street et al. |
| 5,805,456 | A | 9/1998 | Higham et al. |
| 5,812,986 | A | 9/1998 | Danelski |
| 5,875,434 | A | 2/1999 | Matsuoka et al. |
| 5,877,962 | A | 3/1999 | Radcliffe |

(Continued)

FOREIGN PATENT DOCUMENTS

| EP | 732278 | 9/1996 |
| JP | 07-101515 | 4/1995 |

(Continued)

OTHER PUBLICATIONS

U.S. Appl. No. 11/077,430, filed Mar. 10, 2005, Jonathan J. Shakes.

(Continued)

*Primary Examiner* — Yolanda Cumbess
(74) *Attorney, Agent, or Firm* — Robert C. Kowert; Meyertons, Hood, Kivlin, Kowert & Goetzel, P.C.

(57) ABSTRACT

Method and apparatus for multi-destination pick using motes. In embodiments, each receptacle may be assigned to a destination and may have a mote that may include an indicator that may be activated by a control system to indicate to the agent that the receptacle is the destination receptacle for a picked item. The agent may then place the item in the indicated destination receptacle. A mote may include a communication interface for communicating with a control system and with other motes in an ad-hoc network. In one embodiment, the mote on the destination receptacle may be activated when the picked item is scanned by the agent. In some embodiments, each receptacle may also have a sensor that detects when an item is placed in the receptacle to deactivate the indicator and/or to verify that the item was placed in the correct receptacle.

17 Claims, 12 Drawing Sheets

(56) References Cited

U.S. PATENT DOCUMENTS

| | | | |
|---|---|---|---|
| 6,308,109 B1 | 10/2001 | Yuyama et al. | |
| 6,464,142 B1* | 10/2002 | Denenberg | G07F 17/0092 |
| | | | 235/440 |
| 6,650,225 B2* | 11/2003 | Bastian, II | G06F 3/147 |
| | | | 340/5.9 |
| 6,736,316 B2 | 5/2004 | Neumark | |
| 6,775,588 B1 | 8/2004 | Peck | |
| 6,876,902 B2 | 4/2005 | Nikolich | |
| 7,077,318 B2 | 7/2006 | Venema et al. | |
| 2002/0070846 A1 | 6/2002 | Bastian et al. | |
| 2003/0233165 A1 | 12/2003 | Hein et al. | |
| 2004/0035927 A1 | 2/2004 | Neumark | |
| 2004/0160332 A1 | 8/2004 | Perry | |
| 2005/0043850 A1 | 2/2005 | Stevens et al. | |
| 2005/0149226 A1* | 7/2005 | Stevens | B65G 1/1371 |
| | | | 700/214 |
| 2006/0124752 A1 | 6/2006 | Posamentier | |

FOREIGN PATENT DOCUMENTS

| | | |
|---|---|---|
| JP | 80-81025 | 3/1996 |
| JP | 08-119419 | 5/1996 |
| JP | 2000-306062 | 11/2000 |
| JP | 2005-22815 | 1/2005 |

OTHER PUBLICATIONS

Japanese Office Action from Application No. 2008-500826, dated Jan. 24, 2012, Amazon Technologies, Inc., pp. 1-15.

International Search Report and Written Opinion from PCT/US2006/008008, mailed Jun. 13, 2006, pp. 1-11.

U.S. Appl. No. 11/077,485, filed Mar. 10, 2005.

ErgoSense, "Error Proofing Solutions" Electronic Designs, Inc., 2003, pp. 1-2.

Sun Microsystems, Inc., Sun Microsystems Researchers Unveil World's Smallest Secure Web Server, Win Best Paper Award at PerCom 2005, Dec. 23, 2004, pp. 1-2.

Jeff Hodgdon, "State-of-the-Art Direct Distribution at Nintendo of America," University of Wisconsin-School of Business, May 2001, pp. 1-8.

"AutoPICK is an Advanced Pick", printed from http://www.autopick.com/intro.html on Oct. 28, 2004, 1 page.

Crossbow Technology, Inc., Motes, Smart Dust Sensors, Wireless Sensor Networks, 2004, pp. 1-3.

Crossbow, "To Host PC, LAN or Internet," 2004, pp. 1-3.

Farhad Manjoo, "Dust Keeping the Lights Off," Lycos, Inc.—2004, May 28, 2001, pp. 1-3.

Marhsall Brain, "How Motes Work," HowStuffWorks, Inc., 1998-2005, pp. 1-8.

Dataweek, "Leading Lingerie E-Trailer Uses RFID Technology in Efficient E-Fulfilment Solution," Feb. 27, 2002, Technews Publishing (Pty) Ltd., pp. 1-3.

Stephanie Roussel-Dupre, "RFID Tag . . . You're It," Integrated Solutions for Ret@ilers, Jul. 2002, Integrated Solutions Magazine, pp. 1-2.

Paul Demery, ")))  Beep, Beep, Listening to RFID," Apr. 2003, pp. 1-5.

RFID Journal, "RFID Helps to Perfect Order Picking," Apr. 2, 2003, RFID Journal, Inc., pp. 1-2.

LookSmart, "Crossbow Technology Releases Industry's First End-to-End, Low-Power, Wireless Sensor Network Solution for Security, Monitoring, and Tracking Applications," Mar. 2, 2005, pp. 1-2.

ThomasNet, "Workstation Provides Alternative Conveyor Systems," Jan. 30, 2002, Thomas Publishing Company 2007, pp. 1-2.

Adaptive Software, "Thirteen Simple Steps in Selecting a Picking Cart," ads Specialists, Inc., 2002-2003, pp. 1-2.

"Motes, Smart Dust Sensors, Wireless Sensor Networks," Crossbow Technology Inc. 2003, pp. 1-2.

"Innovative Pick to Light Systems," Three Innovative Pick-to-Light Applications, Avery and Associates, Feb. 20, 2005, pp. 1-3.

Innovative Picking Technologies, Inc., "RF Batch Pick Cart," Material Handling Industry of America, printed from web on Apr. 20, 2007, pp. 1-2.

* cited by examiner

METHOD AND APPARATUS FOR MULTI-DESTINATION ITEM SELECTION USING MOTES

This application is a divisional of U.S. patent application Ser. No. 11/077,430, filed Mar. 10, 2005, which is hereby incorporated by reference in its entirety.

BACKGROUND OF THE INVENTION

1. Field of the Invention

This invention relates to inventory selection systems, such as systems for selection of inventory for order fulfillment.

2. Description of the Related Art

Various types of enterprises may maintain inventories from which items may be selected. For example, retailers, wholesalers, and other distributors of product (which may collectively be referred to as distributors) typically maintain an inventory of various items that may be ordered by clients or customers. As another example, manufacturers may maintain inventories of parts, raw materials, and/or partially or fully assembled products. This inventory may be maintained and processed at a materials handling facility which may include one or more of, but not limited to: warehouses, distribution centers, cross-docking facilities, order fulfillment facilities, packaging facilities, shipping facilities, or other facilities or combinations of facilities for performing one or more functions of material (inventory) handling. When a customer places an order, one or several inventory items specified in the order must be retrieved or "picked" from inventory and prepared for delivery to the customer. To prepare the picked items for delivery, the picked items may be delivered to any of a variety of destinations in the materials handling facility, including, but not limited to, sorting stations and packing stations.

FIG. 1 illustrates a broad view of the operation of a conventional materials handling facility. Multiple customers 10 may submit orders 20 to the distributor, where each order 20 specifies one or more items from inventory 30 to be shipped to the customer that submitted the order. To fulfill the customer orders 20, the one or more items specified in each order may be retrieved or "picked" from inventory 30 (which may also be referred to as stock storage) and/or from other locations in the materials handling facility, as indicated at 40. Picked items may be delivered to one of one or more pick destinations 50 in the materials handling facility for processing, such as sorting stations for sorting the items into orders. These pick destinations 50 may include one or more of, but are not limited to, sorting station(s) 54, queue(s) 52 for sorting station(s) 54, station(s) for other processing 58, queue(s) for other processing station(s) 56, and packing station(s) 60. Other processing stations 58 that may be pick destinations 50 may include, for example, various stations that provide value-added services. Examples of value-added services may include one or more of, but are not limited to: gift wrapping, monogramming, battery charging, and so on. In general, any service or processing that may be performed on items after picking and before shipping to the customer(s) may be a possible pick destination 50 for picked items. Physical locations for these pick destinations 50 in a materials processing facility may be referred to herein as "stations". Note that a station may also receive items from one or more other stations for additional processing.

Note that batching is one way for grouping multiple orders together for one pick destination 50. A materials handling facility may be configured to operate as a batching or non-batching facility. In a batching facility, batches themselves may be considered pick destinations 50. A batch may be viewed as a pick destination that comes into existence when a batch is created and disappears when the batch is finished and processed. In a batching situation, conventionally, pickers pick to a single batch (or destination) at a time.

Some picked items may be delivered to a sorting queue 52 for a sorting station 54 where the items may be sorted into their respective orders. Other picked items, such as items for priority orders, may bypass the sorting queue 52 and be delivered directly to a sorting station 54. Note that sorted orders may be conveyed directly from a sorting station 54 to a packing station 60, or alternatively to another sorting station 54 for additional sorting. While not shown, in some implementations, sorted orders may be conveyed to some other processing station 58 or processing station queue 56 for additional processing before being conveyed to a packing station 60.

Conventionally, sorting may be performed using automated sorting mechanisms or manual sorting systems. Sorting stations 54 in a material handling facility may include one or more automated sorting mechanisms, one or more manual sorting stations, or a combination of one or more automated sorting mechanisms and one or more manual sorting stations. Automated sorting mechanisms for sorting certain types of inventory items according to individual orders include, but are not limited to, the Crisplant® sorter, Eurosort® sorters, and automated sorting mechanisms offered by other vendors. Using an automated sorting mechanism, batches or a stream of incoming picked items for multiple different customer orders are received at the automated sorting mechanism and sorted by the automated mechanism according to individual orders.

Different sorting stations 54 in a materials handling facility may be configured to perform sorts of different types and/or sizes of items or different types or sizes of orders. As used herein, the size of an order generally refers to the physical dimensions of the assembled items of the order and not to the number of individual items in the order. Thus, a pick destination 50 for a "batch" of picked items may be a particular sorting station 54 configured to sort that type or size of item, or the type or size of orders for which the items were picked.

In some materials processing facilities, some picked items may be delivered to a queue 56 for some other processing station 58 than a sorting station 54 where additional processing of the picked items may be performed, such as the performance of some value-added service. Other picked items, such as items for priority orders, may bypass the queue 56 and be delivered directly to a processing station 58. Note that processed items may be conveyed to a sorting station 54 or sorting station queue 52 for sorting into orders or, alternatively, directly from a processing station 58 to a packing station 60. Note that some items maybe conveyed to some other processing station 58 for additional processing prior to sorting and/or packing.

Some picked items, such as a group of one or more items making up a complete order that does not require sorting or other processing, may be delivered directly to a packing station 60. After packing, orders are delivered to shipping 70 to be shipped to the customers 10.

Different packing stations 60 in a materials handling facility may be configured to pack different types and/or sizes of orders. As used herein, the size of an order generally refers to the physical dimensions of the assembled items of the order and not to the number of individual items in the order. Thus, a pick destination for a "batch" of picked items may be a particular packing station 60 configured to pack the type or size of orders for which the items were picked.

Note that a picked, packed, and shipped order does not necessarily include all of the items ordered by the customer; a shipped order may include only a subset of the ordered items available to ship at one time from one inventory-storing location. Also note that a materials handling facility typically also includes a receiving operation for receiving shipments of stock from various vendors and placing the received stock into stock storage. Further, note that the various operations of a materials handling facility may be located in one building or facility, or alternatively may be spread or subdivided across two or more buildings or facilities.

FIG. 2 illustrates an exemplary physical layout of a conventional material handling facility, specifically an order fulfillment facility, or center. At any time, one or more agents 42 of the distributor may each be picking items from inventory 30 to fulfill portions or all of one or more orders. This may result in a stream and/or batches of picked items for multiple incomplete or complete orders, which may then be delivered to various stations (pick destinations 50), for example sorting or packing stations, in the materials handling facility for processing prior to shipping 70. A stream may be a continuous or nearly continuous flow of picked items arriving at a station, while groups of items arriving periodically or aperiodically at a station may be referred to as batches. Note that portions of an order may be received from the pickers 42, or from other stations, at a station at different times, so processing at a station may have to wait for one or more items for some orders to be delivered to the station from picking and/or from another station before completion of processing of the orders.

Conventionally, a picker 42 picks items from inventory 30 for only one pick destination 50 at a time. For example, a picker 42 may be instructed to pick items for one order at a time, or items for a batch of orders all going to one pick destination 50 (e.g., to a particular automated sorting station, manual sorting station, packing station, or other processing station), or a list of items from various orders all going to a particular destination, etc. Thus, a picker 42 picks items for one stream or process path for the items, delivers the picked items to their common pick destination 50, and leaves the processing and sorting of the picked items into their individual orders to the downstream station(s). The picker then repeats the process for another list of items potentially for a different pick destination 50.

The stream or batches of incoming picked items are processed at a station, for example sorted into their respective orders at a sorting station. Once the processing of items for an order is completed at a station, the items may be delivered to another station for further processing, for example to a sorting station to be sorted into orders or to a packing station to be packaged for shipping 70. Note that an order fulfillment center may also include one or more receiving stations for receiving shipments of stock from various vendors. The received stock may then be placed into stock storage. Further, note that the various operations and stations of an order fulfillment center may be located in one building or facility, or alternatively may be spread or subdivided across two or more buildings or facilities.

Motes

The "core" of a mote is essentially a very small, low-cost, low-power computer with wireless communications capability that may be coupled to one or more external components of various types depending on the intended function of the mote. The computing core of motes may be implemented on small circuit boards or cards, or even as single "chips". Components of a mote may include, but are not limited to: a CPU, memory, and a radio transmitter/receiver, or other type of wireless transmitter/receiver. The core of the mote may include other components such as an A/D converter for sensor data. This computing "core" of the mote may be coupled to one or more other components including, but not limited to: a battery or other power source, and an antenna. Currently, motes are typically powered by batteries, but alternatively may tap into the power grid in certain applications. Other components, such as sensors, may also be coupled to a mote.

A mote connects to the outside world via a wireless link. Since motes tend to be small, low-cost, and low-power devices, low-power wireless links are typical. The most common wireless links used in motes allow the motes to transmit in a range of 10 to 200 feet (3 to 61 meters). Barriers to longer ranges of transmission include power consumption, size and cost. Note that some motes may be larger and/or may have more powerful power supplies, and thus these motes may have more powerful wireless links. Also note that technological advances and/or the use of more expensive components may provide some motes with more powerful wireless links than typical motes.

All of these components may be packaged together in a small package. Note that this "package" that includes all of the components of the mote is what is referred to when the term "mote" is used herein. Currently, motes, including batteries and antenna, range from the size of a stack of five or six quarters to the size of a deck of cards. The battery is typically the biggest part of the mote. Much smaller motes are possible in the future. As motes shrink in size and power consumption, other power sources, such as solar power or even vibration power, may be introduced.

A programmer may write software to control the mote and to configure it to perform a desired function. Motes may be used in some applications to create ad hoc networks of anywhere from two to thousands of motes that can communicate with each other and pass data from one to another. When a mote or motes are added to such an implementation, each mote "wakes up" and then sends out a radio signal to find its neighboring mote(s). The motes in the implementation may cooperate to create an amorphous, ad-hoc network to perform some task, such as collecting sensor data from an area to be delivered to a central mote or other receiving station.

SUMMARY

Embodiments of a method and apparatus for enabling multi-destination item selection (or pick) using motes in materials handling facilities, such as materials handling facilities used by distributors and/or manufacturers, are described. In embodiments, pick density may be increased by having agents of the materials handling facility pick items for two or more pick destinations at once (which may be referred to hereinafter as simply destinations), thus performing at least some pre-sorting of orders during pick. In embodiments, each receptacle for receiving picked items may be assigned to a destination and may have a mote that may include or be coupled to an indicator that may be activated to indicate to the agent that the particular receptacle is the destination receptacle for a picked item. The agent may then place the item in the indicated destination receptacle, thus avoiding mis-sorts.

Receptacles, as used herein, may include any fixed or mobile mechanism, object, fixture, shelf, container, bin, tote, basket, box, slot, compartment, etc. configured to receive picked items in a materials handling facility. In some embodiments, one or more receptacles, such as totes or bins, may be mobile and thus configured to be placed on or removed from a push cart, conveyor belt, roller, or other device for conveying the receptacles in the materials handling facility. In one embodiment, receptacles may be compartments or subdivisions in, for example, a bin, tote, or shelf. In one embodiment, a bin, tote, basket, or similar container, which may be subdivided into two or more compartments each of which is a receptacle, may include integrated wheels, rollers or some other mechanism for conveying the container in the materials handling facility. In other embodiments, the receptacles may be fixed, for example fixed to the floor or on a shelving unit.

In one embodiment, an agent of a materials handling facility may obtain lists of items to be picked for two or more destinations. The agent may interact with a control system via a communication device carried by the agent to receive the lists and to direct the pick process. In one embodiment, the agent may be equipped with a cart configured to hold a plurality of receptacles such as storage bins, boxes or totes, or alternatively a bin, tote or similar container partitioned into two or more compartments, each compartment of which is a receptacle. The agent may obtain two or more receptacles, which may each be assigned to particular destinations corresponding to the destinations assigned to the agent, and place them on the cart. The number and arrangement of receptacles on the cart may vary. The receptacles may be mobile, and so may be removed from or added to a cart, moved to different carts, rearranged on a cart, delivered to a destination, passed off to another agent to continue the pick process, etc.

In one embodiment, a mote may include a communication interface for communicating with a materials handling facility control system and with other motes in an ad-hoc network. In some embodiments, each mote may include or be coupled to an indicator, such as one or more light emitting diodes (LEDs). In one embodiment, the indicator of the mote on the correct destination receptacle may be activated when the picked item is scanned, or otherwise entered or indicated, by the agent on the agent's communication device. The scanning device may communicate with the control system to indicate which item was picked. The control system may then respond by sending a request message to activate the indicator of the mote on the correct destination receptacle for the item. Each mote may be identified by a unique code such that when a particular mote receives a message via its communication interface, it may responsively activate its indicator. Other methods may be used to activate motes to indicate destination receptacles for picked items. In some embodiments, the indicator may be activated prior to the item being picked and/or scanned by the agent, for example as soon as the next item to be picked is known.

In some embodiments, each receptacle may have a sensor (e.g., a motion detector or RFID sensor) that senses when an item is placed in the receptacle and that may be used to verify that the item was placed in the correct receptacle. In one embodiment, the sensor may be coupled to the mote with the indicator, or alternatively may be coupled to a separate mote on the receptacle, and may be configured to communicate with the control system to send messages when items are placed in the receptacle. In one embodiment, the sensor may be integrated with the mote on the receptacle. In other embodiments, the sensor may be separate from the mote on the receptacle. The sensor may detect placement of an item in the correct receptacle and, in some embodiments, placement of an item in an incorrect receptacle. In some embodiments, if placement of an item in the correct receptacle is detected, an indicator on the mote may be activated to indicate to the agent that the item was placed in the correct receptacle. In some embodiments, if placement of an item in an incorrect receptacle is detected, an indicator on the mote may be activated to indicate to the agent that the item was placed in the wrong receptacle.

In one embodiment, each receptacle may have a mote and sensor, but may not include an indicator. In this embodiment, some other method than an indicator coupled to the mote may be used to indicate to the agent which receptacle is the destination receptacle for an item; for example, directions on which receptacle is the destination receptacle for a picked item may be provided to the agent through the user interface of a communication device carried by the agent. In one embodiment, when the agent places the picked item in a receptacle, the sensor on the receptacle may detect placement of the item, the mote may relay this information to the control system, and the control system may then indicate to the agent if the item was placed in the correct receptacle or in an incorrect receptacle, for example through the user interface of the communication device carried by the agent.

After the item is placed in the correct receptacle as indicated by the activated mote, the indicator coupled to the mote may be deactivated. In one embodiment using sensors, detection of the placement of the item in the receptacle by the sensor may cause the sensor to send a message to the control system, which may then send a message to the mote to deactivate the indicator. Alternatively, the sensor may send a signal directly to the mote to cause it to deactivate the indicator. Note that, in one embodiment, the sensor may be integrated with the mote. Other embodiments may use other methods to deactivate the indicator on a mote; for example, motes may be configured to deactivate the indicator after a time interval, or each mote or indicator may include a button or switch that may be pushed by the agent to deactivate the indicator.

Note that the motes in a materials handling facility may be configured to dynamically cooperatively form an ad-hoc network that uses wireless communication to send, receive, and propagate messages on the network. The motes may use each other's services to propagate packets (messages) on the ad-hoc network. A materials handling facility control system may include one or more control stations configured to wirelessly communicate with the motes and with each other in the ad-hoc network, as well as portable communication devices carried by the agents and various other fixed or portable workstations or devices that also may be configured to participate in the ad-hoc network.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Overview of the Pick Process

Figure 1:
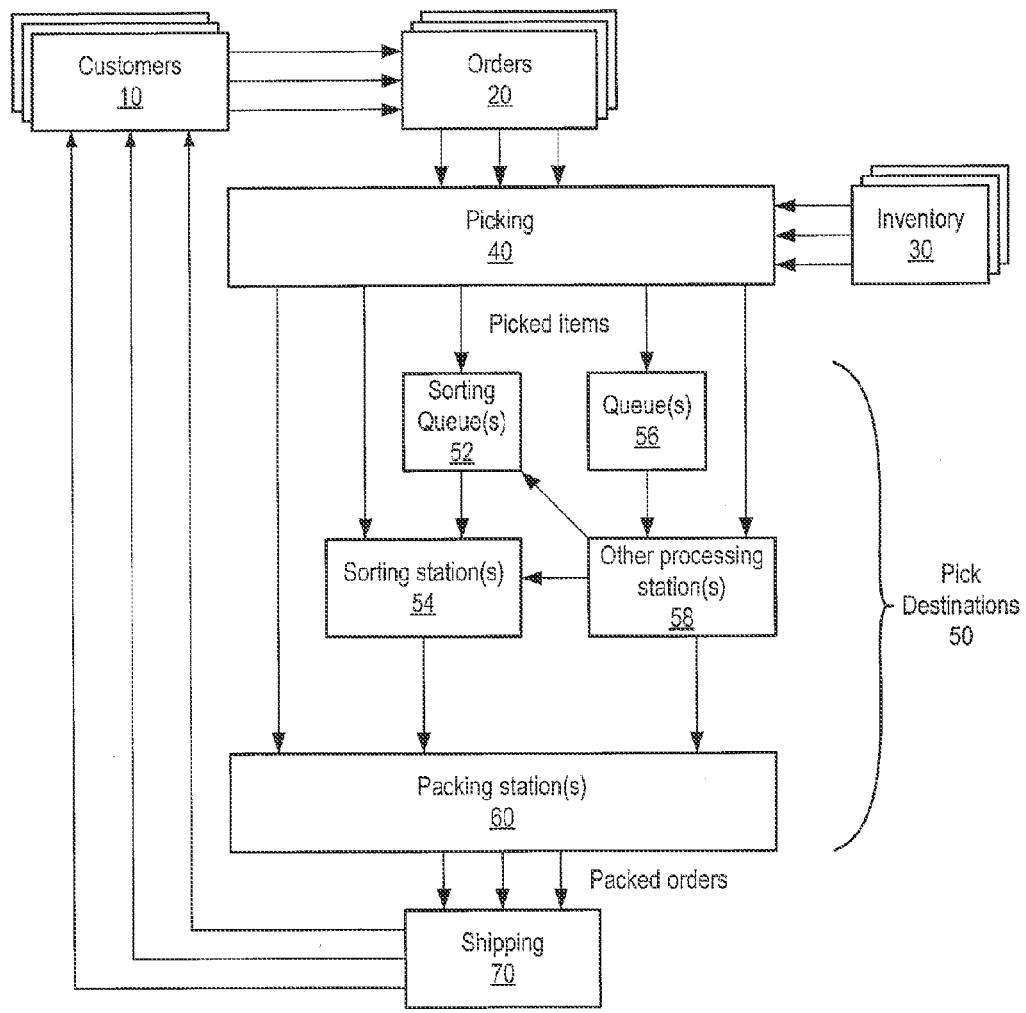
FIG. 1 illustrates a broad view of the operation of a conventional materials handling facility.
Figure 2:
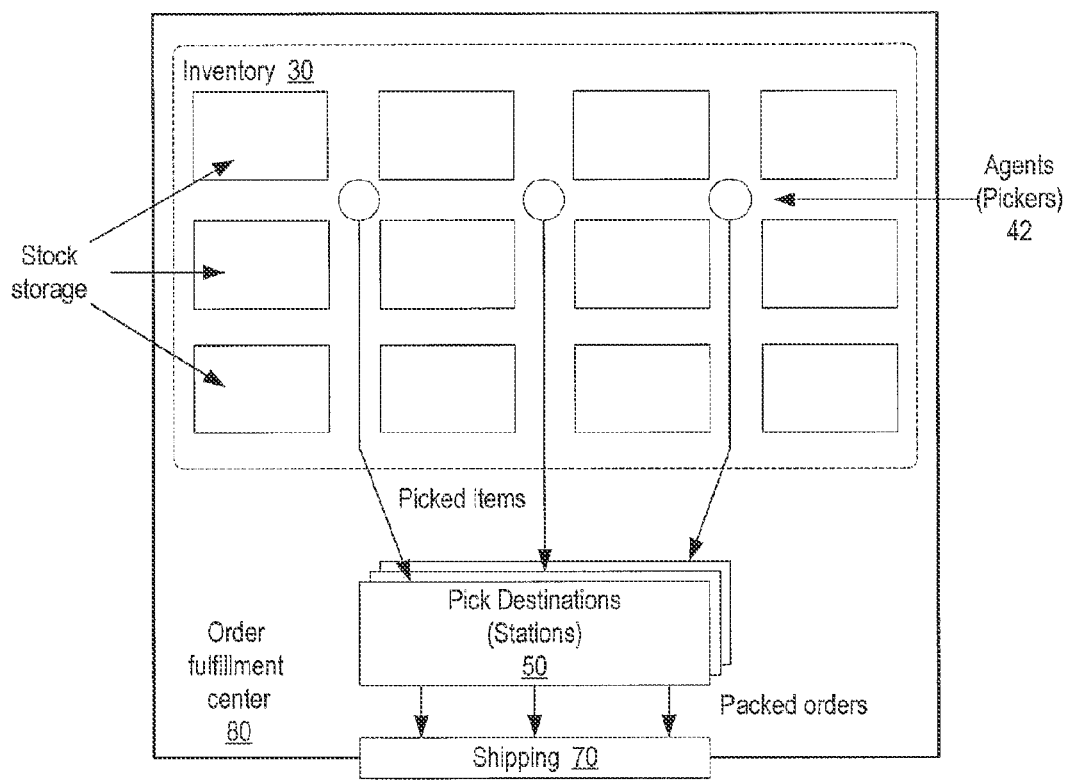
FIG. 2 illustrates an exemplary physical layout of a conventional order fulfillment facility.

Referring to FIG. 2, agents, or pickers, 42 may receive instructions from the control system on a device such as an RF-connected wireless terminal, handheld scanner, or other device, to go to locations in inventory 30 to pick a list of items from those locations. A picker 42 typically scans a picked item to determine if the right item was picked. The picker 42 may then place the picked item in a receptacle for receiving picked items. In some embodiments, the receptacle may be located on or integrated with a mobile cart of some type. There may be more than one receptacle on a cart.

Receptacles, as used herein, may include any fixed or mobile mechanism, object, fixture, shelf, container, bin, tote, basket, box, slot, compartment, etc. configured to receive picked items in a materials handling facility. Receptacles may include one or more of, but are not limited to, fixed or mobile bins, totes, baskets, boxes; compartments within a partitioned bin, tote, basket, box or similar container; bins, totes, slots, boxes, containers, compartments, or some other form of receptacle on a conveyor belt; shelves or sections of partitioned shelves, either fixed or on a mobile shelving unit; wheeled containers; hoppers; induct lanes on an automated sorting mechanism; or in general any device, object, fixture, container, slot, compartment, etc. configured to receive picked items in a materials handling facility. In some embodiments, one or more receptacles, such as totes or bins, may be mobile and thus configured to be placed on or removed from a push cart, conveyor belt, roller, or other device for conveying the receptacles in the materials handling facility. In some embodiments, receptacles may be compartments, subdivisions or partitions in, for example, a bin, tote, or shelf. In one embodiment, receptacles may be shipping boxes, packages, envelopes, or any other type of shipping container that is configured to be processed and shipped after all items for the destination of the receptacle are picked and placed in the receptacle. In some embodiments, a bin, tote, basket, or similar container, which may be subdivided into two or more compartments each of which is a receptacle, may include integrated wheels, rollers or some other mechanism for conveying the container in the materials handling facility. In other embodiments, the receptacles may be fixed, for example fixed to the floor or on a shelving unit.

Conventionally, a picker 42 picks items from inventory 30 for only one pick destination 50 at a time. For example, a picker 42 may be instructed to pick items for one order at a time, or items for a batch of orders all going to one pick destination 50 (e.g., to a particular automated sorting station, manual sorting station, packing station, or other processing station), or a list of items from various orders all going to a particular pick destination, etc. Thus, a picker 42 picks items for one stream or process path for the items, delivers the picked items to their common pick destination 50, and leaves the processing and sorting of the picked items into their individual orders to the downstream station(s). Conventionally, the pickers 42 do not match items with the right orders; the picker is instructed by the control system to pick a list of items and to take those items to a particular pick destination 50. The picker then repeats the process for another list of items potentially for a different pick destination 50.

One reason pickers 42 may be limited to picking for only one pick destination 50 at a time is the added complexity and risk of having a picker 42 sort the items according to multiple pick destinations 50 while locating and picking the items from inventory 30. Picking for multiple pick destinations introduces risk that the pickers 42 will make mistakes and thus deliver one or more items to the wrong pick destinations 50. Such errors, if caught, have to be corrected downstream, adding to the complexity of processing at the downstream stations. For example, if a picker 42 is picking for two different pick destinations 50 and placing the picked items into two different receptacles to be delivered to two different downstream stations, if any items are put into the wrong receptacle, someone at a downstream station such as a sorting station will have to detect and correct the error. If the error is not detected, the mis-sorted item(s) may potentially be delivered to the wrong customer(s). Thus, picking for multiple pick destinations may add complexity to both the pick process and to the processes performed at one or more of the downstream stations.

Note, however, that requiring pickers 42 to pick items from inventory 30 for single pick destinations 50 at a time requires the pickers to traverse the inventory 30 to pick the items for each pick destination 50 separately, reducing the efficiency of the pick process (referred to as pick density). The number of picks in a given space is higher, and the average distance between picks is lower, with higher pick density; thus, increasing pick density results in increased pick productivity. Allowing a picker 42 to pick for two or more pick destinations 50 at a time would allow the picker to pick more items in fewer traversals of the inventory 30, increasing pick density. One solution is to allow a picker 42 to pick items for multiple pick destinations 50 and place the items into receptacles, with one receptacle assigned to each pick destination, while requiring the picker 42 to scan the destination receptacle for each item picked to help avoid mis-sorts. This requirement, however, adds complexity and time to the pick process, potentially making the pickers 42 less efficient. Picking to multiple receptacles assigned to different destinations also adds the risk of the agent placing items into incorrect receptacles, which would then have to be corrected at the downstream stations. If an agent places an item in the wrong receptacle, then one downstream station may receive a receptacle short one item, while another station may receive a receptacle with an extra item. Both stations may then have to take action to correct the errors. Thus, a single error during the pick process may generate problems at two (or more) downstream processing stations that have to be corrected.

Materials Handling Facility Control System

A materials handling facility such as order fulfillment center 80 of FIG. 2 may implement a materials handling facility control system, or control system for short. A control system, such as control system 190 of FIG. 9, may include hardware and software configured for assisting and/or directing agents in the order fulfillment center 80 in fulfilling customers' orders. Items in inventory 30 may be marked or tagged with a bar code, Universal Product Code (UPC), Stock-Keeping Unit (SKU) code, serial number, and/or other designation (including proprietary designations) to facilitate order fulfillment center 80 operations, including, but not limited to, picking, sorting and packing. These designations, or codes, may identify items by type, and/or may identify individual items within a type of item. The control system may include handheld, mobile and/or fixed scanners or scanning devices that may be able to scan, receive, or otherwise detect the marks or tags on individual items and communicate with a control station or stations of the control system to determine and record the item and/or item type of the items.

The control system may be able to receive order information for each order specifying the item or items to be picked to fulfill the order. Each order may be assigned a unique order number for use in the order fulfillment process. Item and/or item type information, including associated item and/or item type designations or codes and possibly other descriptive information, may be entered into the control system by the agent for each item picked from inventory. This information may be scanned into the control system from marks or tags on the items or, alternatively, manually entered. A combination of scanning and manual entry may be employed during picking.

Multi-Destination Pick Using Motes

Embodiments of a method and apparatus for enabling multi-destination pick using motes in materials handling facilities, such as materials handling facilities used by distributors and manufacturers, are described. In embodiments, pick density may be increased by having agents of the materials handling facility pick items for two or more pick destinations (or batches, in a batching facility) at once, thus performing at least some pre-sorting of orders during pick. Pick destinations may be referred to hereinafter as simply destinations. Conventionally, to perform multi-destination picking, the picker may need to scan the destination receptacle(s) for each item picked to avoid mis-sorts, adding complexity to and increasing the likelihood of error in the pick process and thus decreasing productivity. In one embodiment, to eliminate the need to scan receptacles for each item picked, and to help prevent errors in the pick process that will have to be corrected during downstream processing, each receptacle may be assigned to a destination and may have or include a mote which includes an indicator, such as a light emitting diode (LED), which is activated to indicate to the agent that the receptacle is the destination receptacle for a picked item. The agent may then place the item in the indicated destination receptacle, thus avoiding mis-sorts. In one embodiment, each receptacle may have or include a sensor that senses placement of items in the receptacle, and that may be used to detect and correct errors (e.g., placing a picked item in an incorrect receptacle) during the multi-destination pick process, thus reducing or eliminating the need to correct picking errors during downstream processing.

Note that "activate" and "deactivate", when used in relation to motes and indicators herein, implies that the indicator is caused to turn on, turn off, or otherwise modify some signal or indication to the agent (e.g. to turn on or off a light, to change the color of a visual indication, to display or change a text message, to emit, change, or cease an audible signal or message, etc.) in response to some action or detected condition to thus provide information and/or instruction to the agent. This information provided by the activation and deactivation of the mote/indicator may include, but is not limited to, that the receptacle that includes the mote/indicator is the correct destination receptacle for a particular picked item or item to be picked, that the receptacle an item was placed in is the correct (or possibly incorrect) destination receptacle for the item, that a completed receptacle is in proximity to its assigned destination, or in general any other information that may be useful to an agent performing picking or even to other agents performing other functions in a materials handling facility. Activating and deactivating a mote and/or indicator may, but does not necessarily, power on or off the mote and/or indicator. Motes, indicators, and/or sensors described for the various embodiments may be low-power or even zero-power devices, and if powered may have inexpensive power sources, and thus in some embodiments may always be "powered on".

In some embodiments, multiple orders may be selected and assigned to an agent for picking based on the location of the items in inventory storage in order to take advantage of locality of items in the different orders. By enabling pickers to pick for multiple destinations at once, the average distance traveled between each location to pick items may be reduced, thus increasing pick density. Further, picking for multiple destinations enables the pickers to perform at least some pre-sorting of picked items, which reduces the need for sorting in the downstream processing of the items. In some embodiments, picking for multiple destinations may allow all sorting for a given order to be accomplished during the picking process which may reduce or eliminate the need for separate sorting areas or mechanisms in a facility. Embodiments of the method and apparatus for enabling multi-destination pick using motes allow agents to pick to two or more destinations at a time with greater efficiency and accuracy. This may also allow the threshold for the minimum number items in an order that can be pre-sorted during picking to be reduced, which reduces the need for downstream sorting of the items into their respective orders.

Conventionally, in some cases in materials handling facilities, a threshold may be set for the minimum number of items in an order that can be efficiently picked by an agent picking for a single destination, for example 25 items. If a single customer order includes at least this many items (e.g., at least 25 items), it may be efficient to have the agent pick just the items for the single customer order. In conventional facilities, for orders with fewer items, items for two or more of the orders may be picked by the agent into a common receptacle or receptacles without sorting into the individual orders; sorting may then be performed downstream of the pick process. In conventional facilities, having pickers pick items for multiple destinations (e.g. for multiple different orders) requires the picker to correctly sort items into different receptacles as the items are picked. The inefficiencies and errors resulting from combining such sorting with the picking operation have previously made this type of operation infeasible. However, employing motes on the receptacles, as described herein, may improve the efficiency and lower the error rate for multi-destination pick operations in a materials handling facility. Embodiments may enable the pre-sorting or sorting of more orders to be performed during the pick process than conventional pick methods. During a pick run, an agent may be assigned two or more orders to pick items for. For example, multiple smaller orders (e.g. orders having fewer items than a threshold as mentioned above) may be assigned to a single agent for picking. Each order may be considered a "destination" that is picked to, and so each order may be assigned its own receptacle. The motes on the receptacles may be used to direct the agent in placing picked items for the orders into the correct receptacles or compartments assigned to the orders. Using embodiments, an agent may pick to multiple destinations (e.g., orders) during one pick session. Since the agent may pick to multiple destinations (for example, to three orders at a time), the threshold for the minimum size of an order that can be efficiently picked by an agent may be reduced or eliminated, while maintaining acceptable levels of pick density and sort labor for the pickers. This allows a higher percentage of orders to be sorted by the agents during the pick process, thus reducing the sort labor, and possibly even the need for additional, expensive sorting mechanisms, downstream in the materials handling process.

In one embodiment, at least some orders, such as larger orders, may be divided among two or more agents for picking, with each agent picking items for a divided order into a different destination receptacle. The items in the receptacles may then be combined at a downstream station. Note that two receptacles each including items for a particular order may be delivered to different destinations, with the items being combined at a later downstream station.

In one embodiment where the receptacles are mobile, agents may pass off receptacles to other agents to continue the picking of items for the destination. For example, in some materials handling facilities, particular picking agents may be assigned to particular regions of inventory. After an agent has completed picking of items in the agent's assigned region to a receptacle, the agent may pass the receptacle off to another agent to continue picking of items to the receptacle. In this example, the second agent may be considered the "pick destination" for the receptacle for the first agent. The receptacle may be passed to one or more other agents to continue picking After the receptacle is complete (all the items for the downstream destination have been picked to the receptacle), the agent that completed the receptacle may then deliver the receptacle to its downstream destination.

Also note that an agent may pick items from one order into two different receptacles, with the receptacles assigned to different downstream destinations (stations). For example, some items in an order may be assigned to a station for value-added processing, such as gift wrapping, while other items in a different receptacle may be assigned to go to a different station, such as a sorting station, where the items may later be merged with the items in the first receptacle when they arrive at the sorting station.

Note that a materials handling facility may use one or more of the above-described methods for picking items into two or more receptacles assigned to multiple destinations, and/or two or more of the above-described methods in combination.

In one embodiment, a mote may include an indicator, such as one or more light emitting diodes (LEDs), as well as a RF (radio frequency) communication interface, such as a wireless network interface, for communicating with a materials handling facility control system and with other motes in an ad-hoc network. In one embodiment, the mote on the destination receptacle may be activated when the picked item is scanned by the agent. The scanning device may communicate with the control system to indicate which item was picked. The control system may then respond by sending a request message to activate the mote on the destination receptacle for the item. Each mote may be identified by a unique code such that when a particular mote receives a message via its communication interface, it may responsively activate its indicator device.

Other methods may be used to activate motes to indicate destination receptacles for picked items. For example, in one embodiment, in response to an agent arriving at an indicated location or inventory bin in the materials handling facility, the control system may send a message to a particular mote, causing it to activate to indicate to the agent the specific receptacle into which a picked item from that location or bin should be placed.

In some embodiments, each receptacle may also include a sensor (e.g., a motion detector, RFID sensor, light curtain, etc.) that detects when an item is placed in the receptacle and that may be used to verify that the item was placed in the correct receptacle. The sensor may be coupled to the mote with the indicator, or alternatively may be coupled to a separate mote on the receptacle, and may be configured to communicate with and send messages to the control system when items are placed in the receptacle. Note that a sensor may be used to detect placement of an item in the receptacle. In some embodiments, the sensor may be used to distinguish between placement of an item in the correct receptacle or in an incorrect receptacle. In some embodiments, if placement of an item in the correct receptacle is determined, a visual and/or audible indicator on the mote may be activated to indicate to the agent that the item was placed in the correct receptacle. For example, the indicator may flash the LED, or activate an LED of a different color or in a different location than the LED that indicates to the agent the correct receptacle. In some embodiments, if placement of an item in an incorrect receptacle is detected, an indicator on the mote may be activated to indicate to the agent that the item was placed in the wrong receptacle. For example, the indicator may flash the LED, or activate an LED of a different color or in a different location than the LED that indicates the correct receptacle. Alternatively, the indicator may display text messages to indicate correct and/or incorrect placement of an item in a receptacle. For example, the text message may display "Correct receptacle" or similar when an item is placed in the correct receptacle, and "Incorrect receptacle" or similar when an item is placed in an incorrect receptacle. In one embodiment, the indicator may specify the correct receptacle when an item is placed in the wrong receptacle, for example "Please place the item in receptacle 3" or similar message. In some embodiments, rather than having the indicator generate text messages, the picker's communication device, an attachment to the communication device, or some other device, possibly coupled to the push cart, may be used to generate text messages to indicate correct and/or incorrect placement of items in receptacles, and/or other text information about picked items placed in receptacles.

Other methods may be used to indicate placement of an item in a correct or incorrect receptacle, such as audible tones or beeps, with one tone or beep indicating correct placement and another tone or beep indicating incorrect placement, or alternatively an audible tone or beep may only be sounded if the item was placed in an incorrect receptacle. Alternatively, the indicator may generate audible messages to indicate placement of items in correct and/or incorrect receptacles. For example, the audible message may say "Correct receptacle" or similar when an item is placed in the correct receptacle, and "Incorrect receptacle" or similar when an item is placed in an incorrect receptacle. In one embodiment, the indicator may specify the correct receptacle when an item is placed in the wrong receptacle, for example the audible message may say "Please place the item in receptacle 3" or some similar message. Note that combinations of two or more of the above-described methods for indicating placement of items in correct and/or incorrect receptacles may be used in some embodiments. For example, an indicator may both activate LEDs and generate audible messages to indicate correct and/or incorrect placement of items in receptacles. In some embodiments, rather than having the indicator generate audible tones or messages, the picker's communication device, an attachment to the communication device, or some other device, possibly coupled to the push cart, may be used to generate audible tones or messages to indicate correct and/or incorrect placement of items in receptacles, and/or other audible information about picked items placed in receptacles.

After the item is placed in the correct receptacle as indicated by the activated mote, the indicators of the mote may be deactivated. In one embodiment using sensors, detection of the placement of the item in the receptacle by the sensor may cause the sensor to send a message to a control system, such as control system 190 of FIG. 9, which may then send a message requesting deactivation of the indicator on the mote (i.e., "turn off" its indicator). Alternatively, the sensor may send a signal directly to the mote to cause it to deactivate the indicator. Other embodiments may use other methods to deactivate the indicator on a mote; for example, a mote may be configured to deactivate its indicator after a time interval, such as ten seconds. As another example, each mote may include a button or switch that may be pushed by the agent to deactivate or "reset" the indicator on the mote, or alternatively the agent may deactivate the indicator on a mote via the user interface (UI) of the agent's communication device.

Note that the indicators may be activated and deactivated as described above. In embodiments including sensors, a sensor may be active or "sensing" continuously, and not just when the control system expects the sensor to sense something. In one embodiment, the communication device of a picker working with a particular cart may be receiving messages continuously from the motes on all the receptacles on the cart. In one embodiment, the sensors may be "talkative" and report all sensed movement to the communication device. In this embodiment, the communication device may "subscribe" to any sensor messages from a particular set of motes. Unsubscription may occur when the receptacle/mote has been delivered to the pick destination, or alternatively at some period after delivery in case the picker indicates on the communication device that one receptacle is being delivered but actually delivers another receptacle. In another embodiment, the motes may be "quiet" and the communication device may be "talkative". In this embodiment, the communication device may keep the motes/sensors on a particular cart informed as to whether motion is expected or not. As long as the sensors detect motion (or lack of motion) in accordance with expectations, nothing may be reported back to the communication device; the sensors may only report unexpected events.

Note that the motes on the receptacles in a materials handling facility may be configured to cooperatively form an ad-hoc network that uses wireless communication to send, receive, and propagate messages on the network. The motes may use each other's services to propagate packets (messages) on the ad-hoc network. A materials handling facility control system may include one or more control stations configured to wirelessly communicate with the motes and with each other (via wired or wireless connections) in the ad-hoc network, as well as portable communication devices carried by the agents and various other fixed or portable workstations or devices that also may be configured to participate in the ad-hoc network. Motes may be out of the range of a control station, so messages to a mote from a control station may be propagated via one or more other motes or other in the materials handling facility, and vice versa. In one embodiment, there may be a gateway point or points that serves as a gateway for the motes to a central server or control station of the materials handling facility control system. Note that other components the materials handling facility, such as stock storage bins, carts, and stations, may include motes used for various other purposes that also may be configured to participate in the ad-hoc network.

Figure 3:
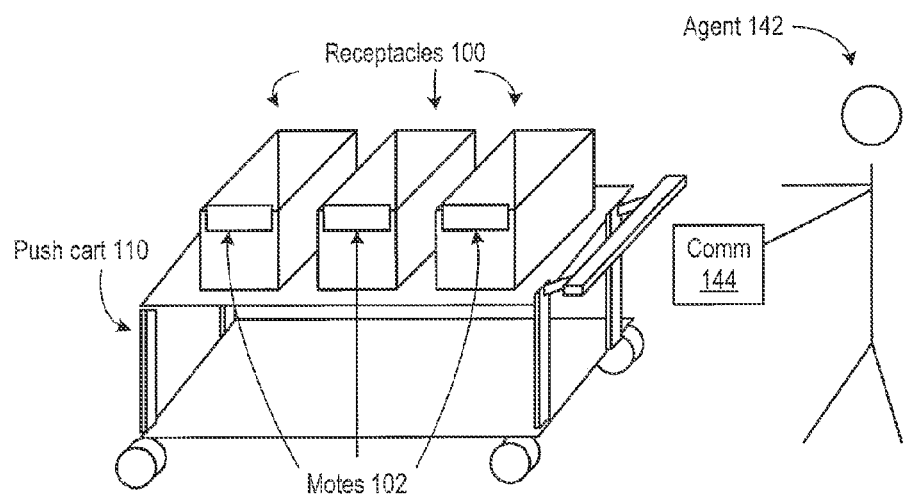
FIG. 3 is a block diagram illustrating one embodiment of an agent picking to multi-destination receptacles with motes in a materials handling facility

One embodiment of an agent picking to multi-destination receptacles with motes is illustrated in FIG. 3. In this embodiment, agent 142 may be an employee of the materials handling facility with a push cart 110 configured to hold a plurality of storage bins or totes, where each tote (or, alternatively, each of one or more compartments within one or more of the totes) is a receptacle 100. The number and arrangement of receptacles 100 on the cart may vary from that shown. The receptacles 100 may be mobile, so the receptacles 100 may be removed from or added to a cart 110, moved to different carts, rearranged on a cart, etc. Agent 142 may interact with a corresponding communication device 144, which may be a handheld device, a device worn by or attached to the agent, or a device integrated into or mounted on push cart 110 in various embodiments.

Communication device 144 may be configured to convey instructions to agent 142 as to what actions to perform within the materials handling facility. In one embodiment, communication device 144 may receive from a materials handling facility control system a list of items to be picked from bins or locations in inventory, which may be referred to as pick modules, and may present the items to pick and the pick modules to agent 142 via a display portion of the device such as a screen. Communication device 144 may also receive and display a list of one or more destinations for the picked items in the materials handling facility from the control system. Agent 142 may then collect the receptacles 100 for the indicated destinations and place them on the cart. Any of a variety of methods may be used to assign receptacles 100 to destinations.

A mote 102 may be coupled to each receptacle 100. In one embodiment, as indicated in FIG. 3, a mote 102 may be located near or at the top edge of the receptacle 100, or alternatively built into the rim of the receptacle 100. In one embodiment, a sensor may be integrated with the mote 102 to sense events inside the receptacle 100, for example the placement of picked items in the receptacle 100. In other embodiments, rather than having a sensor integrated with the mote 102, a sensor may be located apart from the mote 102 on the receptacle 100, for example on the top edge of the opposite side of the receptacle 100. Mounting the motes 102 at or near the top edge of the receptacles 100 may allow the motes 102 to be visible when the receptacles 100 are nestably stacked. Note that, in other embodiments, the mote 102, and sensor if present, may be located in other positions on the inside or outside of the receptacle 100 than the position shown, either on the top edge or elsewhere on the sides or even bottom of the receptacle 100.

In one embodiment, each receptacle 100 may be marked or tagged with a bar code, radio frequency identification (RFID) tag, serial number, and/or other designation (including proprietary designations) that uniquely identifies the receptacle 100 among the receptacles in the materials handling facility. Note that this unique identifier may also be assigned to the mote 102 attached to the receptacle 100, and used by the control system to associate the mote 102 with the receptacle 100. In one embodiment, agent 142 may select a receptacle 100 from a repository for receptacles 100 in the materials handling facility, and the receptacle's unique identifier may be scanned or otherwise entered in the communication device 144 by agent 142. The control system may then associate that particular receptacle 100 with a particular destination. This process may be repeated for each destination indicated to agent 142 on communication device 144. Alternatively, one receptacle 100 for each destination may be selected and placed on cart 110, and then each receptacle may be scanned by agent 142 to assign destinations to the receptacles 100. In one embodiment, receptacles 100 placed on cart 110 may be scanned in a particular order, for example left to right, and the assignment of destinations to the receptacles 100 may be performed to correspond to the list of destinations presented to agent 142, for example with the leftmost or first scanned receptacle 100 assigned to the first destination, the next or second scanned mote 100 assigned to the second destination, and so on. Alternatively, the agent may already have one or more receptacles 100 on push cart 110 from a previous pick session, and one or more of the receptacles 100 on the cart 110 may be reused in the next pick session by reassigning the receptacles to different destinations for the next pick session.

In some embodiments, selected receptacles 100 may not initially be assigned to particular destinations. Instead, a receptacle 100 may, for example, be assigned to a destination when placement of a first picked item for that destination in the receptacle 100 is detected by a sensor on the receptacle. Alternatively, when agent 142 picks and scans a first item for a destination, agent 142 may scan or otherwise enter the unique identifier of an empty receptacle 100 on cart 110, which may then be assigned to the destination. Subsequent scanning of picked items for that destination may then activate the mote 102 on the receptacle 100 assigned to that destination. In one embodiment, an agent 142 may select a receptacle 100 in which to place a particular picked item from one or more unassigned receptacles on the cart, for example if the item is not bound for any of the pick destinations already assigned to receptacles 100 on the cart. The agent 142 may then interact with the control system, such as control system 190 of FIG. 9, via the communication device 144 to assign the receptacle 100 to the destination for the item. Subsequent items picked for that destination may then be placed in the receptacle 100 as indicated by the control system interacting with the mote 102 on the receptacle. In one embodiment, agent 142 may be allowed to override the destination assigned to a receptacle 100 and place a picked item instead into a different, possibly unassigned, receptacle, for example a larger receptacle if the receptacle assigned to the destination is insufficiently large, or an empty, possibly unassigned receptacle if the receptacle assigned to the destination for the item lacks sufficient space for the item. The agent 142 may then interact with the control system via the communication device 144 to assign the receptacle 100 to the destination for the item. Subsequent items picked for that destination may then be placed in the receptacle 100 along with the item as indicated by the control system interacting with the mote 102 on the receptacle.

In response to receiving instructions to pick various items, agent 142 may navigate push cart 110 to a first indicated pick module (or, alternatively, to the closest indicated pick module if the indicated pick modules are not specifically ordered by the control system). Once at an indicated pick module, agent 142 may select an instance of an indicated item from the indicated pick module. For example, agent 142 may retrieve an item from a bin, pallet, chute, or other configuration of pick module. In some cases, agent 142 may also inspect the condition of the item, and may select an item only if it is in suitable condition (e.g., is clean, undamaged, unopened, has an appropriate expiration date, or satisfies some other set of criteria).

Items in inventory may be marked or tagged with a bar code, radio frequency identification (RFID) tag, Universal Product Code (UPC), Stock-Keeping Unit (SKU) code, serial number, and/or other designation (including proprietary designations) to facilitate materials processing facility operations including, but not limited to, picking, sorting and packing. These designations, or codes, may identify items by type, and/or may identify individual items within a type of item. In one embodiment, once an item has been picked, agent 142 may scan or otherwise enter the code for the picked item in communication device 144. Alternatively, the agent may select a button or other mechanism on the communication device 144 corresponding to the item to indicate that the item was picked. Communication device 144 may then send a message to a control system, such as control system 190 of FIG. 9, indicating the picked item. The control system may then activate the indicator of the mote 102 on the receptacle 100 assigned to that destination. Note that, in embodiments including sensors on the receptacles 100, the sensors may always be active and communicating sensed events to the control system and/or to the agent via the agent's communication device. In one embodiment, push cart 110, each receptacle 100, or communication device 144 may include a proximity detection mechanism that may detect an RFID tag on each item picked when the item is within range of the mechanism. The proximity detection mechanism may then relay information on the item to the control system, which may then activate the indicator of the mote 102 on the receptacle 100 assigned to the destination for the item.

In some embodiments, the indicator may be activated prior to the item being picked and/or scanned by the agent, for example as soon as the next item to be picked is known. Activating the indicator before the item is picked and/or scanned may provide one or more advantages. One advantage is that the agent may start preparing physically to place the item into a particular indicated receptacle 100 before the item is picked, for example by making sure that he/she is standing on the optimal side of the cart when the item is picked. Another advantage is that potential network delay in getting the message to the indicator on the receptacle to activate the indicator may be absorbed while the agent is picking the item, rather than having the agent wait for the indicator on the destination receptacle to be activated after scanning the item. In one embodiment, for example, when the agent 142 begins a pick session, the indicator on a receptacle 100 that is the destination receptacle for the first item to be picked may be activated. After that item is picked and placed in the indicated receptacle 100, the indicator on the receptacle that is the destination receptacle for the next item to be picked may be activated, and so on. In another embodiment, the agent 142 may select a next item to be picked on the user interface of the communication device carried by the agent. The communication device may communicate this information to the control system, which may then send a message to the mote 102 on the destination receptacle 100 for the item to activate the indicator on the receptacle. Alternatively, the communication device may send a message directly to the mote on the destination receptacle to activate the indicator. In yet another embodiment, a proximity detection mechanism, as described above, may detect when the cart is in proximity to the storage area for an item to be picked in the stock storage or some other location in the materials handling facility and cause the indicator on the destination receptacle to activate. Other embodiments may use other mechanisms to activate an indicator on a destination receptacle prior to the item being picked and/or scanned by the agent. For example, in one embodiment the storage bin where the item is located may include a motion detector that detects motion of the agent when picking the item and relays this information to the control system. The control system may then send a message to the mote on the destination receptacle for the item to activate the indicator. As another example, in one embodiment, the control system may track the location of the agent, cart, and/or receptacles in the materials handling facility, and may send a message to a mote on a receptacle to activate the indicator on the receptacle when the agent/cart is at or near the location of an item to be picked.

In one embodiment, the communication device and/or control system may not provide directions for a subsequent item to be picked to the agent until confirmation has been received that the appropriate sensor sensed motion in the correct receptacle for the current item being picked. Alternatively, motion detected by a sensor in an incorrect receptacle may raise an exception or otherwise block the agent from continuing the pick session until the error has been resolved.

Note that, in some embodiments where receptacles are not assigned to destinations until a first item for the destination is picked, assignment of a receptacle 100 on cart 110 to the destination may be performed using some method such as the ones described above if the picked item is the first item for a particular destination. Agent 142 may then place the picked item into the indicated receptacle 100 on cart 102. In embodiments including a sensor, the placement of the item in the receptacle 100 may be detected and the control system may be notified that the item was placed in the receptacle. Note that the sensor may detect placement of an item in the correct or in an incorrect receptacle 100, and that the control system may activate the mote 102 on the receptacle 100 in which the item was placed to signal to agent 142 if the item was placed in the correct (or incorrect) receptacle 100. After placement of the item in the receptacle 100, the mote 102 may be deactivated using some method as previously described. Agent 142 may then repeat the pick process for each item on the list of items to be picked.

After agent 142 has picked all indicated items for all destinations assigned to the agent, the agent may then deliver each receptacle 100 on cart 102 to its assigned destination. The control system may communicate with agent 142 via communication device 144 to direct the agent to the destination for each receptacle 100. In one embodiment, as an agent approaches a station, the control system may detect the one or more receptacles on the agent's carts that are assigned that station as their destination, and activate an indicator on the receptacle(s) to indicate to the agent that the receptacle(s) are to be delivered to that station. Alternatively, the materials handling facility may include a conveyance mechanism, such as a conveyor belt, onto which the agent may induct the completed receptacles 100. The conveyance mechanism may then deliver the receptacles 100 to the stations assigned as destinations in the materials handling facility. In one embodiment, the conveyance mechanism may be configured to automatically deliver receptacles 100 to the correct destinations (stations) as directed by the materials handling facility control system. For example, the conveyance mechanism may scan or otherwise detect the unique identifier of each receptacle 100, and the control system may direct the conveyance mechanism as to which destination the receptacle 100 is to be delivered. In one embodiment, the conveyance mechanism may be configured to communicate with the motes 102 on the receptacles 100 to determine, as directed by the control system, the destinations for the receptacles 100. In other embodiments, other agents at the stations may scan or otherwise enter receptacles 100 on the conveyance mechanism to determine, as directed by the control system, if the receptacles 100 are assigned to their station. Alternatively, as a receptacle approaches a station on the conveyance mechanism, the control system may detect that the receptacle is assigned to that station as its destination, and activate an indicator on the receptacle to indicate to an agent at that station that the receptacle is for that station.

After completion of processing of the items in a receptacle 100 at a station, the items may be delivered to another station for further processing. For example, the items may be sorted into their respective orders at a manual or automated sorting station, and then delivered to a packing station or stations. As another example, the items may be gift-wrapped at a gift-wrapping station, and then delivered to a sorting station to be sorted into their respective orders. In one embodiment, the processed items may be placed back into the receptacle 100, or alternatively into a different receptacle or receptacles 100, which may then be directed to the next station or stations for the items in the receptacle(s) 100 by the control system. Note that, in some embodiments, the motes 102, indicators, and sensors on the receptacles 100 may be configured to perform other functions under direction of the control system to facilitate processing at the one or more downstream stations(s) of the receptacles than the function(s) described herein for the pick process.

Numerous different embodiments of communication device 144 are possible and contemplated. In some embodiments, communication device 144 may include a portable general-purpose computer system configured to execute an operating system and one or more applications, while in other embodiments, communication device 144 may include an embedded computer system configured to execute customized software applications. In various embodiments, communication device 144 may support numerous different interface mechanisms, such as video displays of various sizes and resolutions, audio input/output capabilities (e.g., for voice communication), optical (e.g., bar code) scanning devices, RFID detectors, wireless or wired network interfaces, or various combinations of these, which may be directly integrated within communication device 144 or implemented by separate devices interfaced with communication device 144.

In some embodiments, the actions of agent 142 may be partially or completely performed by an autonomous robot. For example, in some embodiments both item picking and transportation may be performed robotically, whereas in other embodiments items may be picked by human employees while robotic push carts 110 operate independently of the human pickers. Alternatively, push carts 110 may be replaced with other conveyance systems such as such as conveyor belts, track-based carts, AGVs (Automated Guided Vehicles), wheel-mounted shelving units etc., or some agents 142 may carry one or more receptacles 100 without the use of a push cart 110. As noted above, in embodiments employing push carts 110, the configuration of receptacles 100 may vary in various embodiments. For example, push carts 110 may have more or fewer receptacles 100 than shown, and receptacles 100 may be arranged in different fashions, such as by varying the angle at which receptacles 100 are mounted in order to facilitate access to receptacles 100 at various heights on carts 110.

Figure 9:
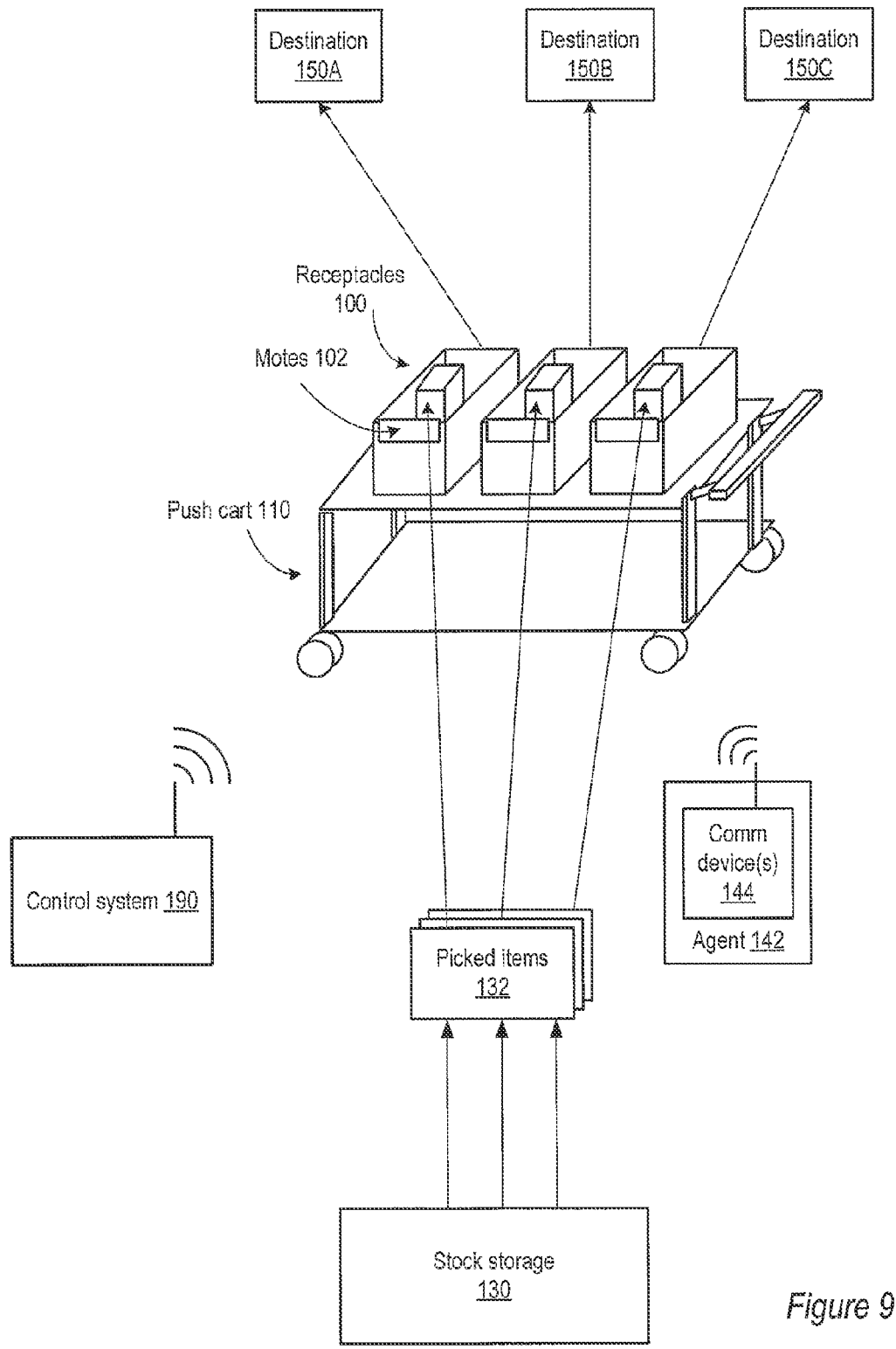
FIG. 9 illustrates operations of an exemplary materials processing facility implementing receptacles with motes and a control system according to one embodiment.

In one embodiment, a control system, such as control system 190 of FIG. 9, may be able to detect the location of motes in the facility, for example using a GPS system or through proximity detection using proximity detectors and/or other motes in the ad-hoc network. In this embodiment, the control system may be able to detect approximately where each receptacle 100, or other component with a mote attached, is located in the materials handling facility. In one embodiment, each cart 110 may have a mote coupled to the cart, and the control system may be able to track the location of each cart 110 via the mote on the cart, and thus the agent 142, in the materials handling facility. The control system may use this location information to direct the agent 142 in the pick process, for example to indicate which items are nearby to be picked, to direct the agent 142 to a different location to pick one or more items, or to indicate to the agent 142 that one or more receptacles 100 are to be dropped off at a nearby station that is the assigned destination for the receptacle(s), for example by sending a request message to activate an indicator on the receptacle(s). Alternatively, location of an agent 142 in the materials handling facility may be tracked using the agent's communication device 144.

Figure 4:
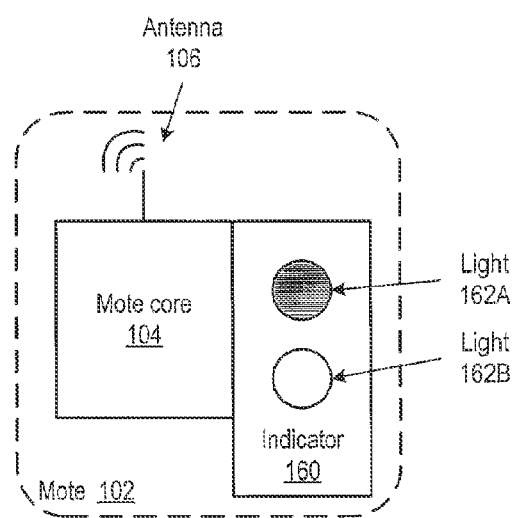
FIG. 4 is a block diagram that illustrates an exemplary configuration for a mote according to one embodiment.

FIG. 4 is a block diagram that illustrates an exemplary configuration for a mote on a receptacle according to one embodiment. The core 104 of the mote is essentially a very small, low-cost, low-power computer with wireless communications capability. Components of the mote core 104 may include, but are not limited to: a CPU, memory, and a communications interface, such as a radio transmitter/receiver. The core 104 may be coupled to one or more other components including, but not limited to: a battery or other power source (not shown), an antenna 106, an indicator 160, and one or more sensors (not shown). Indicator 160 may include one or more lights, LEDs, LCDs, or other mechanisms for visually and/or audibly communicating with a picking agent of the materials handling facility to facilitate picking for multiple destinations under direction of a control system as described herein. All of these components are packaged together in a small package, mote 102, which may be attached to the inside or outside of a receptacle. The mote 102 may be programmable to configure it to perform a desired function or functions, such as the functions of the multi-destination pick process described herein.

FIG. 4 illustrates an embodiment with an indicator 160 including two lights, 162A and 162B. Other embodiments may include one, or more than two, lights. In one embodiment, mote 102 may include an integrated sensor (not shown) to detect motion inside the receptacle, for example placement of an item in the receptacle. In other embodiments, the receptacle may include a sensor that is coupled to, but not integrated with, the mote 102, via a wired or wireless connection. In an embodiment with two lights 162, for example, a first light (light 162A) may be configured to be activated to indicate the receptacle is the destination receptacle for a picked item, and the second light (light 162B) may be configured to be activated to indicate placement of an item in the wrong receptacle and/or to indicate placement of an item in the correct receptacle. The lights may be, but are not necessarily, different colors, for example green and red, or green and amber. Any color or combination of colors may be used. In an embodiment with one light 162, the light may, for example, be configured to light continuously or alternatively to flash or blink, to indicate the receptacle is the destination receptacle for a picked item. In some embodiments, the single light may be configured to indicate placement of an item in the correct or in an incorrect receptacle. For example, the light may be configured to change colors to indicate placement in the correct and/or in an incorrect receptacle, with different colors indicating correct or incorrect placement. Alternatively, or in addition, the light may be configured to flash or blink at different rates to indicate placement of an item in the correct and/or in an incorrect receptacle. In some embodiments, audible signals may be used to indicate the placement of an item in the correct and/or in an incorrect receptacle.

Figure 5A:
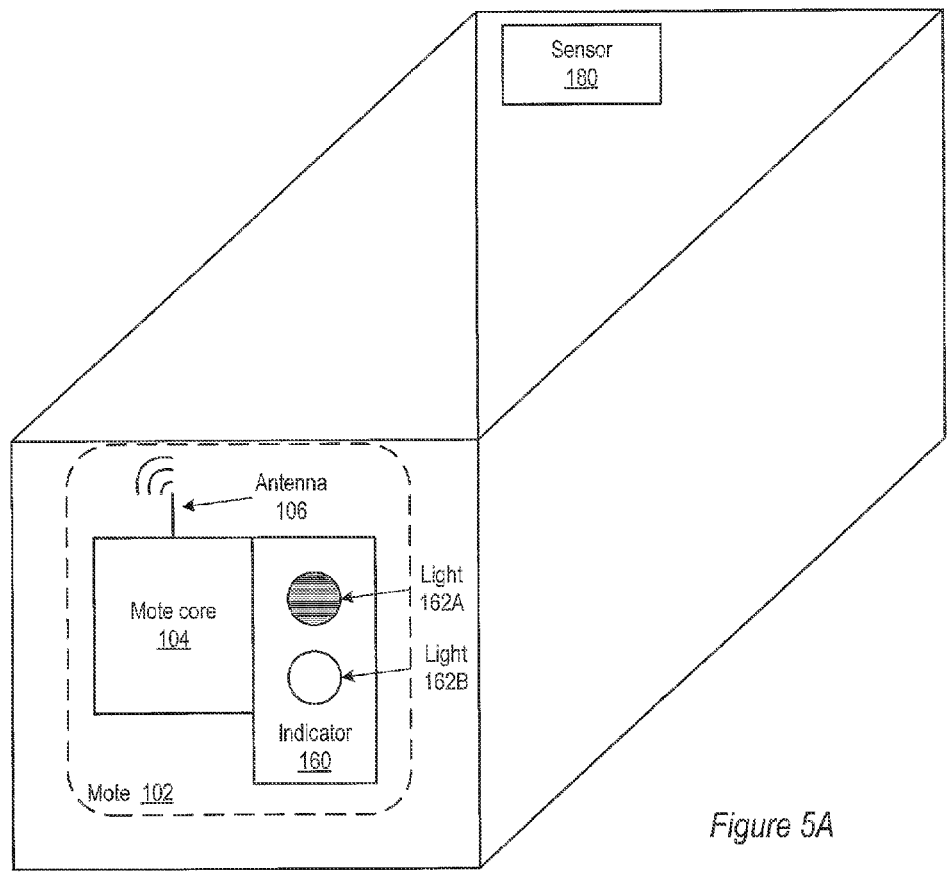
FIG. 5A shows the mote illustrated in FIG. 4 attached to the outside of a receptacle according to one embodiment.

FIG. 5A shows the mote illustrated in FIG. 4 attached to the outside of a receptacle (for example, a tote) according to one embodiment. Note that mote 102 may be attached elsewhere on receptacle 100, for example on the inside instead of the outside. Mote 102 may also be coupled to a sensor 180, such as a motion detector or RFID sensor, for detecting placement of items into the (correct or incorrect) receptacle as described herein. Sensor 180 may be coupled to mote 102 via a wired or wireless connection. In one embodiment, a different mote attached to receptacle 100 may be coupled to the sensor 180, and may be configured to communicate sensor data to mote 102 and/or to a control system, such as control system 190 of FIG. 9. Also note that mote 102, sensor 180, and receptacle 100 are not necessarily shown to scale; a mote 102 is typically much smaller relative to the receptacle 100.

FIGS. 4 and 5A show indicator 160 adjacent to mote core 104. Note that, in some embodiments, indicator 160 may not be adjacent to core 104, but instead may be located at some distance from core 104 on the receptacle 100.

Figure 5B:
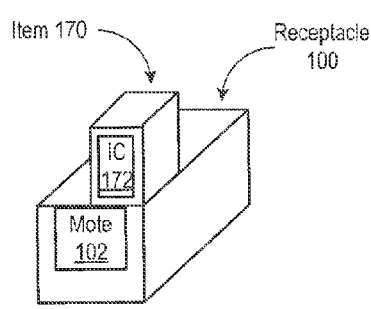
FIG. 5B illustrates a receptacle with a mote, such as the exemplary mote and receptacle illustrated in FIG. 5A, with an exemplary item stored therein.

FIG. 5B illustrates a receptacle including a mote, such as the exemplary mote and receptacle illustrated in FIG. 5A, with an exemplary item stored therein. Item 170 includes an item code (IC) 172, which may be a bar code, RFID tag or other type of code. For some types of items, item code 172 may uniquely identify each individual instance of the item 170, akin to a unique serial number, while for other items, item code 172 may uniquely identify only the type of the item 170. In one embodiment, item code 172 may be scanned or otherwise input into a communication device by an agent when picked. Identifying the particular receptacle 100 for a particular destination into which the scanned item 170 is to be placed may be facilitated by incorporating active technology (mote 102) into receptacle 100. Mote 102 may include an indicator, such as a light emitting diode (LED), as well as a communication interface, such as a wireless network interface. Each mote 102 may be identified by a unique code or identifier, so that when a particular mote 102 receives a message via its communication interface, it may responsively activate its indicator device. For example, in one embodiment, in response to agent 142 scanning item code 172 of item 170, the control system may send a message to mote 102, causing it to illuminate an LED to indicate to agent 142 that the item is to be placed in the receptacle 100, which is assigned to the particular destination for the item. In some embodiments, mote 102 may be further configured to detect when item 170 has been placed into receptacle 100, for example using a motion detector, RFID sensor, or other technique.

Figure 5C:
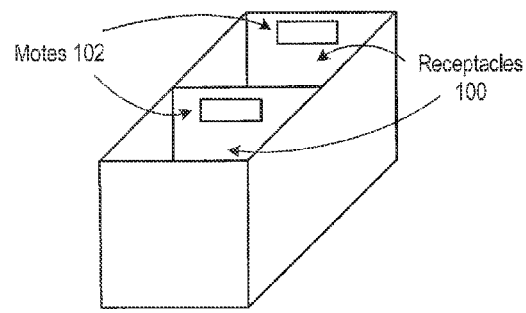
FIG. 5C illustrates an exemplary tote partitioned into compartments, where each compartment is a receptacle, and where each compartment has a mote, according to one embodiment.

In one embodiment, one or more containers such as totes, bins, baskets, shelves, etc. in a materials handling facility may be partitioned or subdivided into two or more compartments of the same or different sizes, and each compartment may be a receptacle for receiving picked items which may be assigned to a particular destination. In this embodiment, each compartment or receptacle 100 in a partitioned container may include a mote 102, as shown in FIG. 5C. Each mote 102 may be assigned an identifier that uniquely identifies the mote, and thus the receptacle 100 to which the mote 102 is attached. In one embodiment, each receptacle 100 in a partitioned container may be assigned to a different destination in the materials handling facility by the control system, and the motes 102 in the receptacles 100 may be activated to indicate the correct receptacles 100 in which an agent performing picking is to place picked items using a method similar to the methods described herein for non-partitioned containers. For example, when an agent picks and scans an item, the control system may respond by lighting an LED on an indicator attached to a mote in a particular receptacle 100 of a partitioned container on the cart the agent is using. Note that each receptacle 100 may also include a sensor to detect placement of an item in the receptacle 100 as described elsewhere herein for non-partitioned containers.

In one embodiment, rather than each receptacle 100 of a partitioned container including a mote 102, each partitioned container may include one "master" mote that handles communications with other motes, the control system, etc., and each receptacle 100 may include an indicator and/or a sensor that communicates with the "master" mote on the container via a wired or wireless mechanism. In one embodiment, the partitioned container may include one mote with an indicator coupled to or integrated with the mote, and each receptacle 100 may include a sensor that communicates with the mote. In this embodiment, the sensor in a receptacle 100 may sense when an item is placed in the receptacle 100 and communicate that information to the mote, which may then relay the information to the control system. The control system may then send a message to the mote to activate the indicator to indicate whether the item was placed in the correct receptacle 100 or in an incorrect receptacle 100. Note that, in some embodiments, there may be no indicators on the container. In these embodiments, some other method of signaling to the agent whether the item was placed in the correct or in an incorrect receptacle 100 may be used. For example, the control system may communicate this information to the agent via a communication device carried by the agent. Also note that, in embodiments where each receptacle 100 does not include an indicator, some other method of directing the agent as to which receptacle 100 is assigned to a destination may be used. In one embodiment, this information may be provided to the agent via the user interface of the communication device carried by the agent. For example, two or more containers may be arranged in a known order on the cart, and each receptacle 100 may be numbered. The control system, for example, may indicate to the agent, via the communication device, that an item to be picked, or a picked item, is to be placed in the second receptacle 100 from the front of the first container from the left on the second row from the top of the cart (e.g., "Place Item X in Receptacle 2 of Container 2A").

Figure 6:
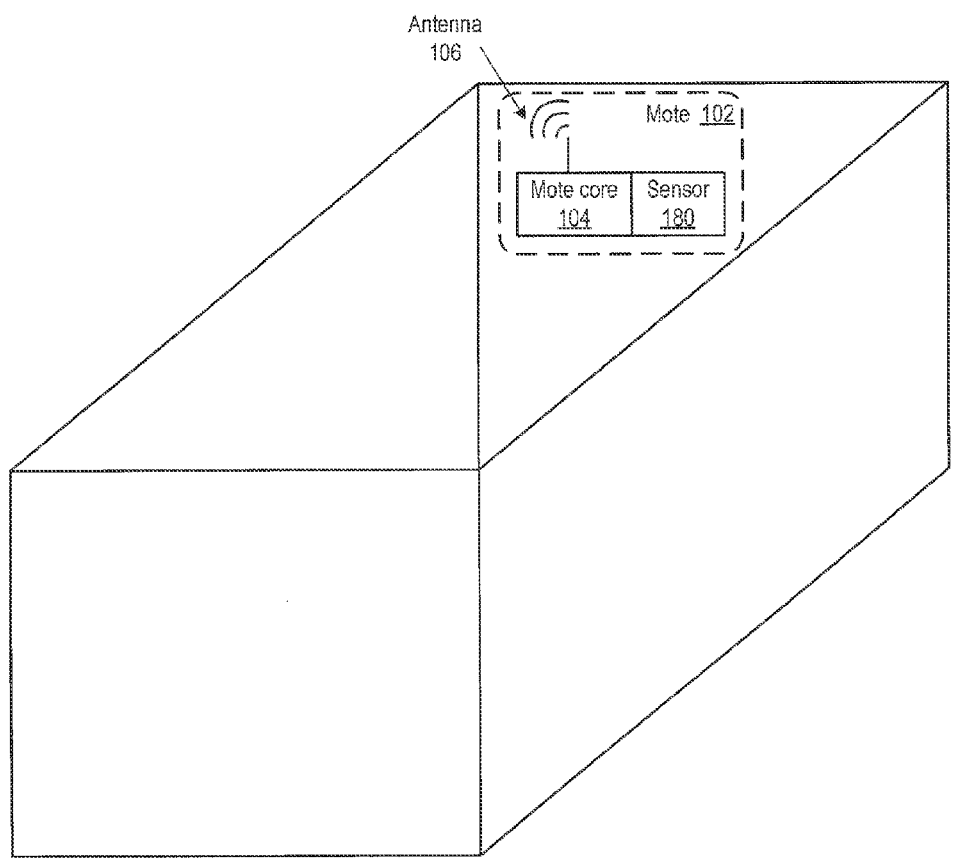
FIG. 6 illustrates a receptacle with a mote and sensor but no indicator, according to one embodiment.

FIG. 6 illustrates a receptacle including a mote and sensor but no indicator, according to one embodiment. In this embodiment, each receptacle may include a sensor 180 (e.g., a motion detector or RFID sensor), integrated with or alternatively coupled to the mote 102, that senses when an item is placed in the receptacle and that may be used to verify that the item was placed in the correct receptacle. In one embodiment, the sensor 180 may be configured to communicate with the mote 102 to send a message to the control system when the sensor 180 detects an item is placed in the receptacle 100. In one embodiment, the sensor 180 may be integrated with the mote 102 on the receptacle 100. In other embodiments, the sensor 180 may be separate from the mote 102 on the receptacle 100. The sensor 180 may be used to detect placement of an item in the correct receptacle and, in some embodiments, placement of an item in an incorrect receptacle.

In this embodiment, some other method than an indicator on the receptacle may be used to indicate to the agent as to which receptacle 100 is the destination receptacle for an item. For example, directions as to which receptacle on the cart is the destination receptacle for an item to be picked or for a picked item may be provided to the agent through the user interface of a communication device carried by the agent. In one embodiment, when the agent places a picked item in a receptacle 100, the sensor 180 on the receptacle 100 may detect the placement of the item in the receptacle and communicate this information to the mote 102. The mote 102 may then relay this information to the control system, such as control system 190 of FIG. 9, and the control system may then indicate to the agent if the item was placed in the correct receptacle or in an incorrect receptacle, for example through the user interface of the communication device carried by the agent.

In general, since the motes, sensors, and indicators may be inexpensive and numerous, they may fail on occasion, and therefore embodiments may be designed to be fault-tolerant and not fail just because the mote, sensor, and/or indicator fails or provides false information. For example, some types of sensors used in some of the embodiments above may be "imprecise". If motion detectors are used (instead of, for example, RFID sensors) then the sensor may not be able to distinguish whether a particular item has been placed into the receptacle, and may only be able to detect that an item has been placed in the receptacle. In addition, some sensors may produce "false positives" in certain conditions; for example, jostling a receptacle may cause a previously picked item in that receptacle to shift which, to the sensor, would look identical to a new item being placed in the receptacle, generating a false positive reading. As another example, the agent may accidentally trigger the motion detector of one receptacle while physically working with another receptacle, which may generate one or more false positive readings in conjunction with zero or one true positive reading (since the sensor in the receptacle where the item was actually placed may or may not read accurately). As yet another example, an agent may first mistakenly place an item into one receptacle, and then remove the item and place it in another receptacle. Embodiments may include various mechanisms to help detect and correct for imprecision in sensors such as the generation of "false positives."

One solution to these problems with imprecision in sensors including the generation of false positives is to build in redundancy. Redundancy may also help prevent or solve other potential problems, such as the failure of motes, sensors, or indicators. Built-in redundancy may also help to reduce or eliminate the placement of items in the wrong receptacles. For example, in one embodiment using indicators on the receptacles to indicate to the agent which receptacles to place items in, the communications device that directs the agent as to which item is to be picked, where to go to pick the item, etc., may also provide redundant information to direct the agent as to which receptacle is the correct destination receptacle to place the picked item in. If the indicator on a mote fails to light, the agent can tell from the communication device which receptacle the item is to be placed in. As another example, if the sensor on a destination receptacle fails to detect and/or report that an item was placed in the receptacle, and all of the other receptacles' sensors have also not detected or reported an item placed in any of the other receptacles, and the agent, through the communication device, indicates that the pick and placement of the item has been completed, and the sensors in all of the currently accessible receptacles are known to have been recently operational, then the control system may assume that the picked item was placed in the correct destination receptacle, because it may be more likely that the correct receptacle's sensor failed to detect or report the placement of the item than it is that an incorrect receptacle's sensor failed to detect/report an event and the picker made an error in placement during the exact same transaction.

Some embodiments may use redundant motes, sensors, and/or indicators on receptacles. In these embodiments, there may be more than one mote, sensor, and/or indicator, with one mote, sensor, and/or indicator serving as the primary and the other serving as a "backup" in case the primary fails. Other embodiments, as described above, may use other redundant mechanisms, such as the communication device used to redundantly display the correct destination receptacle for an item) and/or redundant logic, such as the logic used to determine that it is safe to assume that an item was placed in the correct receptacle even if the sensor fails to detect and/or report placement of an item in the receptacle.

Figure 7:
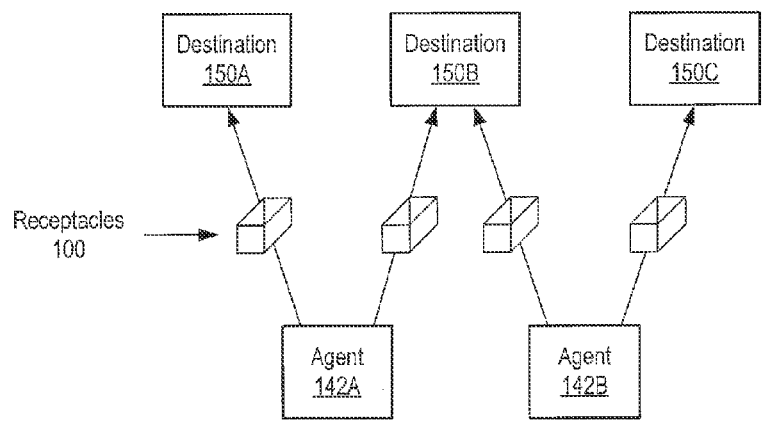
FIG. 7 illustrates agents delivering completed receptacles to multiple destinations in a materials handling facility according to one embodiment.
Figure 8:
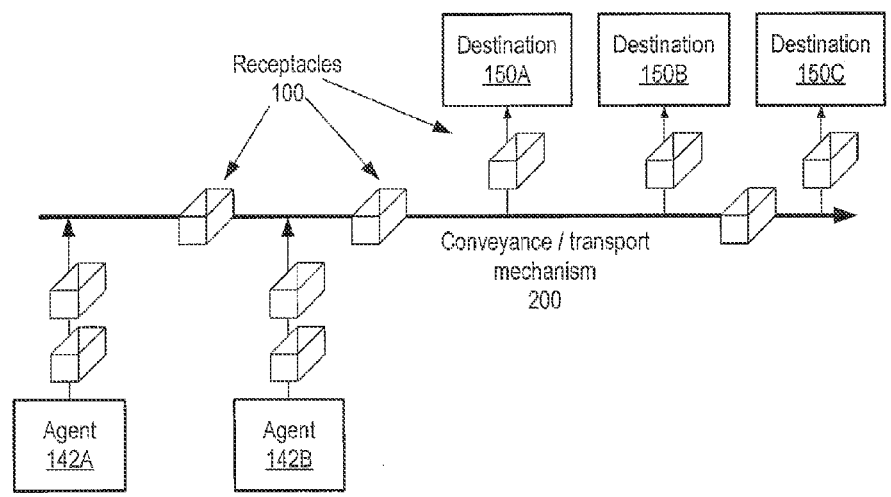
FIG. 8 illustrates agents delivering completed receptacles to a conveyance mechanism for conveying the receptacles to multiple destinations in a materials handling facility according to one embodiment.

FIGS. 7 and 8 illustrate delivery of completed receptacles to multiple destinations according to embodiments. In FIG. 7, after an agent 142 performing picking has picked all indicated items for all destinations assigned to the agent, the agent 142 may then deliver each receptacle 100 to its assigned destination 150. The control system may communicate with the agent 142 via a communication device to direct the agent to the destination 150 for each receptacle 100. Note that two or more agents 142 may be simultaneously performing picking of items and/or delivery of completed receptacles 100 to destinations 150, with each agent picking items for or delivering completed receptacles 100 to one or more of the same or different destinations 150 in the materials handling facility.

As illustrated in FIG. 8, the materials handling facility may include a conveyance mechanism 200, such as a conveyor belt, onto which each agent 142 may induct the completed receptacles 100. The conveyance mechanism 200 may then deliver the receptacles 100 to the destinations 150 (stations) in the materials handling facility. In one embodiment, the conveyance mechanism 200 may be configured to automatically deliver receptacles 100 to the correct destinations 150 as directed by the materials handling facility control system. For example, the conveyance mechanism 200 may scan or otherwise detect the unique identifier of each receptacle 100, and the control system may direct the conveyance mechanism 200 as to which destination 150 (station) the receptacle 100 is to be delivered. In one embodiment, the conveyance mechanism 200 may be configured to communicate with the motes 102 on the receptacles 100 to determine, as directed by the control system, the destinations 150 for the receptacles 100. In other embodiments, other agents (for example, a packer at a packing station, or an agent at a sorting station) at the destinations 150 (stations) may scan or otherwise enter receptacles 100 on the conveyance mechanism 200 to determine, as directed by the control system, if the receptacles 100 are destined for their stations.

For both FIGS. 7 and 8, after completion of processing of the items in a receptacle 100 delivered to a destination 150, the items may be delivered to another station for further processing. For example, the items may be sorted into their respective orders at a manual or automated sorting station, and then delivered to a packing station or stations. As another example, the items may be gift-wrapped at a gift-wrapping station, and then delivered to a sorting station to be sorted into their respective orders. In one embodiment, the processed items may be placed back into the receptacle 100, or alternatively into a different receptacle or receptacles 100, which may then be assigned to the next station or stations for the items in the receptacle(s) 100 by the control system. Note that, in some embodiments, the motes 102, indicators, and sensors on the receptacles 100 may be configured to perform other functions under direction of the control system to facilitate processing at the one or more downstream stations than the function(s) described herein for the pick process.

FIG. 9 illustrates operations of an exemplary materials processing facility implementing receptacles with motes and a control system according to one embodiment. In this embodiment, at least some operations of the materials handling facility may be directed, controlled, monitored, and/or recorded by a materials handling facility control system 190. Control system 190 may include hardware and software configured to direct employees of the materials handling facility (such as agent 142) in the various operations of the materials handling facility including one or more of, but not limited to: picking, sorting, packing, and shipping. The hardware of control system 190 may include, but is not limited to, one or more of any of various types of devices, including, but not limited to, personal computer systems, desktop computers, laptop or notebook computers, mainframe computer system(s), workstations, network computers, storage systems, printers, or other devices.

Communication device 144 may be configured to communicate with control system 190, for example via radio communication, wireless networking, and/or a wired communication protocol, to convey instructions from control system 190 to agent 142 as to what actions to perform while picking items for multiple destinations within the materials handling facility. Communication device 144 may include one or more of, but is not limited to: handheld devices, devices worn by or attached to the agent 142, and devices integrated into or mounted on any mobile or fixed equipment of the materials handling facility such as push carts, bins, totes, racks, shelves, tables, and work benches. Communication device 142 may include one or more of, but are not limited to: personal computer systems, desktop computers, rack-mounted computers, laptop or notebook computers, workstations, network computers, "dumb" terminals (computer terminals with little or no integrated processing ability), Personal Digital Assistants (PDAs) or other handheld devices, proprietary devices, printers, or any other devices suitable to communicate with control system 190. In general, a communication device 144 may be any device that can communicate with control system 190 and convey instructions to agent 142. In one embodiment, communication device 144 may be configured to scan or otherwise read or receive codes or identifiers of various components in the materials handling facility, including the codes of items 132 in inventory, and to communicate the entered codes to the control system 190 for use in directing agent 142 in the pick process. Components that may include such codes or identifiers that may be scanned or otherwise read or received by communication device 144 may include one or more of, but are not limited to, items 132, orders, sorting or other stations, bins, totes, compartments of partitioned totes, and even agents.

In picking, in one embodiment, communication device 144 may receive from the control system a list of items to be picked from stock storage 130 or from elsewhere in the materials handling facility, and may present the list of items to pick to agent 142 via a display portion of the device such as a screen. Additional information, such as location information for the items to be picked and information on the orders that the picked items are for, may also be displayed. Communication device 144 may also receive from the control system, and display, a list of one or more destinations 150 in the materials handling facility for the list of items to be picked. Agent 142 may then collect the receptacles 100 (for example, a container such as a tote, or partitioned containers where each partition is a receptacle 100) for the indicated destinations 150 and place them on the cart 110. Any of a variety of methods may be used to assign receptacles 100 to destinations 150, as previously described for FIG. 3.

Agent 142 may then pick the items 132 from stock storage 130 or from elsewhere in the materials handling facility. In one embodiment, as each item is picked, an item code of the item 132 may be scanned or otherwise entered on communication device 144. Alternatively, the agent may select a button or other mechanism on the communication device 144 corresponding to the item to indicate that the item was picked. Communication device 144 may then send a message to control system 190 indicating the item picked. Control system 190 may then determine which destination 150 the picked item 132 is for, and may send a message to the mote 102 on the receptacle 100 assigned to that destination 150 to activate the mote, thus indicating to the agent 142 which receptacle 100 on cart 110 the item is to be placed in. Alternatively, push cart 110, each receptacle 100, or communication device 144 may include a proximity detection mechanism that may detect an RFID tag on each item picked when the item is within range of the mechanism. The proximity detection mechanism may then relay information on the picked item to the control system, which may then send a request message to the appropriate mote 102 to activate the indicator of the mote 102 on the receptacle 100 assigned to the destination 150 for the item.

In some embodiments, the indicator may be activated prior to the item being picked and/or scanned by the agent, for example as soon as the next item to be picked is known. In one embodiment, for example, when the agent 142 begins a pick session, the indicator on a receptacle 100 that is the destination receptacle for the first item to be picked may be activated. After that item is picked and placed in the indicated receptacle 100, the indicator on the receptacle that is the destination receptacle for the next item to be picked may be activated, and so on. In another embodiment, the agent 142 may select a next item to be picked on the user interface of the communication device carried by the agent. The communication device may communicate this information to the control system, which may then send a message to the mote 102 on the destination receptacle 100 for the item to activate the indicator on the receptacle. Alternatively, the communication device may send a message directly to the mote on the destination receptacle to activate the indicator. In yet another embodiment, a proximity detection mechanism, as described above, may detect when the cart is in proximity to the storage area for an item to be picked in the stock storage area or elsewhere in the materials handling facility and cause the indicator on the destination receptacle to activate. Other embodiments may use other mechanisms to activate an indicator on a destination receptacle prior to the item being picked and/or scanned by the agent. For example, in one embodiment the storage bin where the item is located may include a motion detector that detects motion of the agent when picking the item and relays this information to the control system. The control system may then send a message to the mote on the destination receptacle for the item to activate the indicator. As another example, in one embodiment, the control system may track the location of the agent, cart, and/or receptacles in the materials handling facility, and may send a message to a mote on a receptacle to activate the indicator on the receptacle when the agent/cart is at or near the location of an item to be picked.

Note that, in some embodiments, one or more of receptacles 100 may be partitioned into two or more compartments, with each compartment including a mote. In this embodiment, a mote in a particular compartment may be activated to indicate to agent 142 which compartment in a receptacle 100 the item is to be placed in. Also note that, in some embodiments, each receptacle 100 (or each compartment in each receptacle) may also include a sensor that detects placement of an item in the receptacle. This information may be sent to the control system 190, which may use the information to deactivate the mote, and/or to determine if the item was placed in the correct receptacle. If it is detected that the item 132 was placed in an incorrect receptacle, the control system 190 may activate the mote to indicate to the agent 142 that the item was placed in the wrong receptacle.

After all the items 132 for all the destinations 150 assigned to the agent 142 in this particular pick session have been picked and placed in the correct receptacles 100, the completed receptacles may be delivered or conveyed to their assigned destinations 150 under direction of the control system 190. In this example, a first receptacle 100 is assigned to and delivered, when complete, to destination 150A; a second receptacle 100 is assigned and delivered to destination 150B, and a third receptacle 100 is assigned and delivered to destination 150C. Note that two or more receptacles 100 may be assigned and delivered to one destination 150 by agent 142 in one pick session. After delivering the receptacles 100 to their assigned destinations 150, the agent 142 may then receive a new list of items and destinations and repeat the process.

Figure 10:
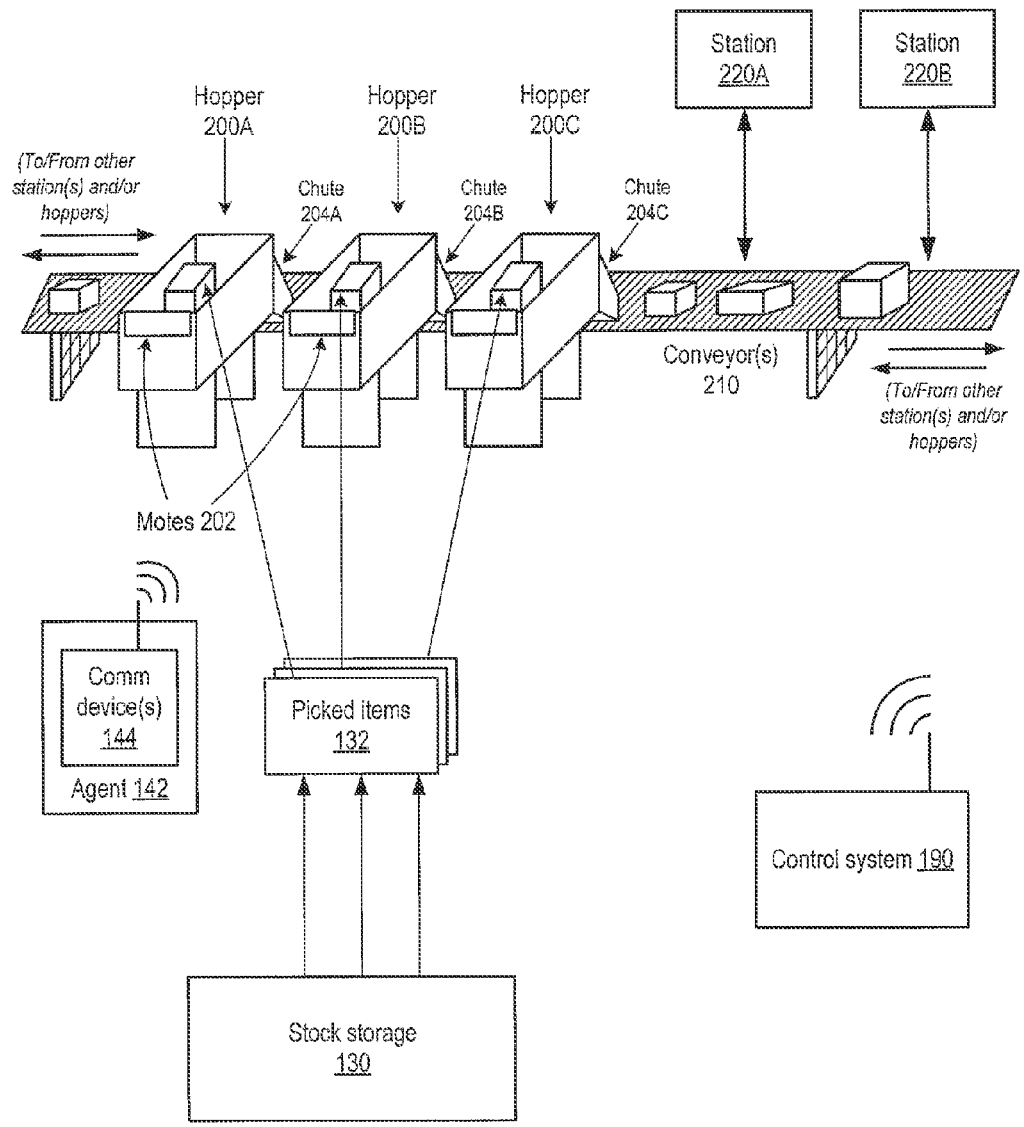
FIG. 10 illustrates an exemplary materials processing facility that implements hoppers, with motes, adjacent to a conveyor according to one embodiment.

FIG. 10 illustrates an exemplary materials processing facility that implements hoppers, with motes, adjacent to a conveyor according to one embodiment.

In this embodiment, one or more hoppers 200 adjacent to a conveyor 210 may be destinations that an agent 142 may pick to in a pick session. In one embodiment, agent 142 may pick items from stock storage 130 or from elsewhere in the materials handling facility as directed by control system 190 through communication device 144 carried by the agent 142. The agent may then place the picked items 132 directly into hoppers 200 as directed by indicators integrated with or coupled to motes 202 attached to the hoppers 200 under control of control system 190.

In picking, in one embodiment, communication device 144 may receive from the control system a list of items to be picked from stock storage 130 or from elsewhere in the materials handling facility, and may present the list of items to pick to agent 142 via a display portion of the device such as a screen. Additional information, such as location information for the items to be picked and information on the orders that the picked items are for, may also be displayed. Communication device 144 may also receive from the control system, and display, a list of one or more hoppers 200 in the materials handling facility that are destinations for the list of items to be picked.

Agent 142 may then pick the items 132 from stock storage 130 or from elsewhere in the materials handling facility. In one embodiment, as each item is picked, or alternatively after all items are picked (e.g., into a common bin or tote), an item code of each item 132 may be scanned or otherwise entered on communication device 144. Alternatively, the agent may select a button or other mechanism on the communication device 144 corresponding to the item to indicate that the item was picked. Communication device 144 may then send a message to control system 190 indicating the item picked.

Control system 190 may then determine which hopper 200 the picked item 132 is for, and may send a message to the mote 202 on the hopper 200 to activate the mote, thus indicating to the agent 142 which hopper 200 the item is to be placed in. Alternatively, each hopper 200 or a group of hoppers 200 may include a proximity detection mechanism that may detect an RFID tag on each item picked when the item is within range of the hopper(s). The proximity detection mechanism may then relay information on the picked item to the control system, which may then send a request message to the appropriate mote 202 to activate the indicator of the mote 202 on the hopper 200 that is the correct destination for the item.

Note that motes 202 may include or may be coupled to sensors on hoppers 200 that may be used to detect and alert agent 142 to the correct or incorrect placement of items in hoppers 200 by agent 142 as described for receptacles elsewhere herein.

Each hopper 200 may include a chute 204 via which items placed in the hoppers 200 are periodically or aperiodically moved from the hopper 200 onto conveyor 210. Conveyor 210 may be unidirectional or bi-directional. In one embodiment, there may be two or more conveyors 210, with each hopper 200 emptying items onto one or more of the conveyors 210 via a chute 204. On conveyor 210, items may be conveyed to one or more stations 220 for further processing.

Note that a materials handling facility may use a combination of two or more different types of receptacles with motes including or coupled to indicators and/or sensors as described herein, including hoppers 200 adjacent to conveyors 210, in the pick process. For example, in one embodiment, agent 142 may pick items from stock storage 130 or from elsewhere in the materials handling facility as directed by control system 190 through communication device 144 and place the picked items 132 into one or more receptacles (e.g. totes, bins, a cart, boxes, compartments of a tote or bin, shelves, etc.), possibly as directed by control system 190 via motes with indicators coupled to the receptacles. The agent may then move the picked items 132 from the receptacle(s) to the hopper(s) 200 as directed by control system 190 via motes 202 with indicators coupled to the hoppers 200. As another example, in one embodiment, one or more agents may pick items into receptacles on carts as described for FIG. 9, while one or more other agents may pick items into hoppers 200 as described for FIG. 10. The combination of motes with hoppers as described herein may facilitate an agent sorting picked items into the correct hopper(s). The function of the hoppers may be controlled to release items onto a conveyor at an appropriate time(s) to moved items from the hopper to another destination.

Figure 11:
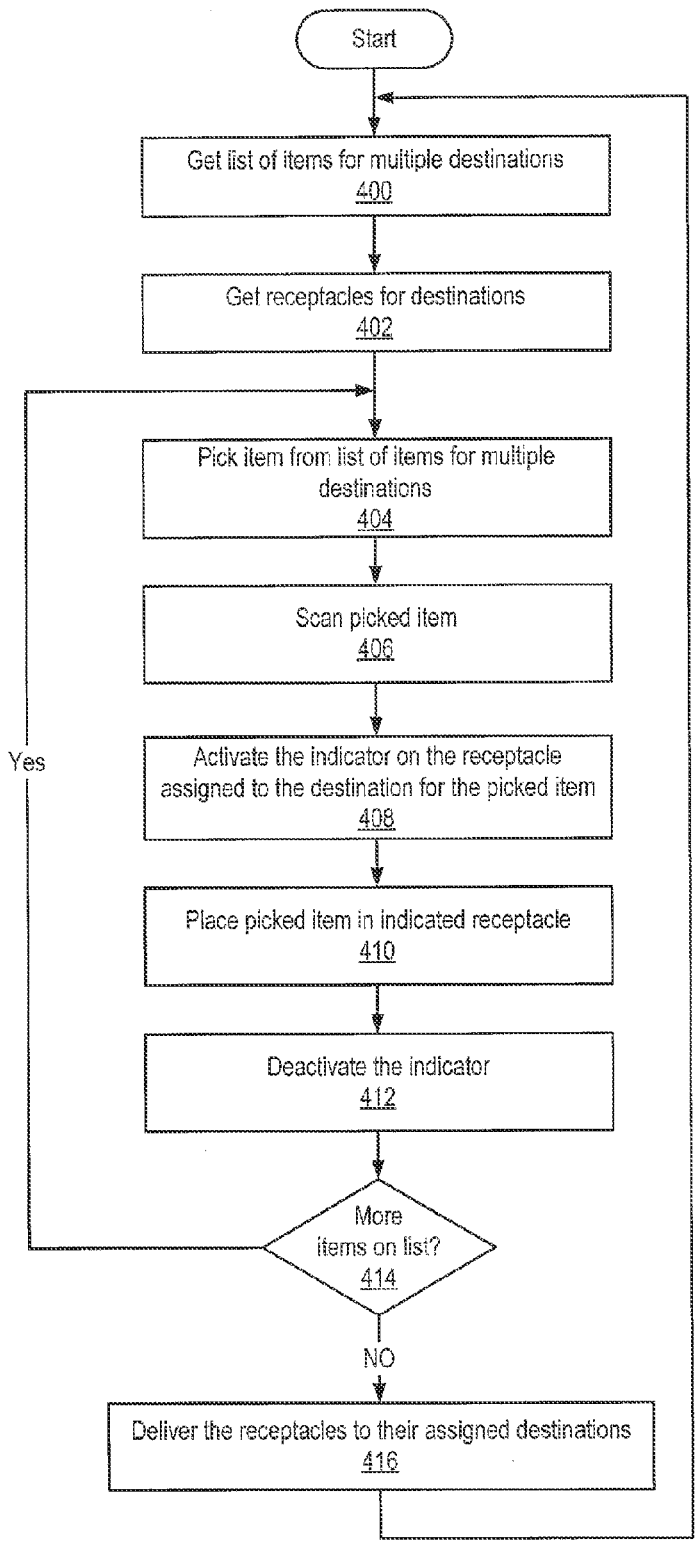
FIG. 11 is a flowchart of a method for performing multi-destination pick using receptacles with motes according to one embodiment.

FIG. 11 is a flowchart of a method for performing multi-destination pick using receptacles with motes according to one embodiment. As indicated at 400, an agent may be assigned a list of items for two or more destinations by a control system. In one embodiment, a communication device used by the agent may receive from the control system a list of items to be picked from stock storage or from elsewhere in the materials handling facility, and may present the list of items to pick to agent via a display portion of the device such as a screen. Additional information, such as location information for the items to be picked and information on the orders that the picked items are for, may also be displayed. The communication device may also receive from the control system, and display, a list of one or more destinations in the materials handling facility for the list of items to be picked. As indicated at 402, the agent may then obtain the receptacles for the indicated destinations and place them on a cart. Any of a variety of methods may be used to assign receptacles to destinations, as previously described for FIG. 3. Alternatively, the agent may already have one or more receptacles on a push cart from a previous pick session, and one or more of the receptacles on the cart may be reused in the pick session by reassigning the receptacles to different destinations for the pick session.

The agent may then be directed by the control system to, or alternatively may just select and go to, a location in stock storage or elsewhere in the materials handling facility at which an item on the list of items to be picked is stored. The agent may then pick the item from the location in stock storage or from elsewhere in the materials handling facility, as indicated at 404. The agent may then scan or otherwise enter the picked item into the agent's communication device, as indicated at 406. Information on the picked item may then be sent to the control system, which may determine the destination for the picked item and send a request message to the appropriate mote to activate the indicator on the receptacle assigned to the destination for the item, as indicated at 408, to indicate to the agent which receptacle the item is to be placed in. Note that, in some embodiments, the indicator may be activated prior to the item being picked and/or scanned by the agent, for example as soon as the next item to be picked is known, as previously described. The agent may then place the item in the receptacle indicated by the activated mote. The mote may then be deactivated, as indicated at 412. In one embodiment, the receptacle may include a sensor that detects placement of the item in the mote. The sensor may then communicate this information to the control system, which may send a message to the mote to deactivate the indicator in response to the detection of the placement of the item in the receptacle. Note that the sensor may also be used to determine placement of the item in the correct receptacle, and to indicate, through the indicator on the mote, that the item was placed in the correct (or incorrect) receptacle, so that an error in the placement of an item into the destination receptacles may be corrected by the agent before continuing the pick session. Other embodiments may use other methods to deactivate the indicator. For example, the mote (or indicator) may be configured to deactivate the indicator after a time interval, for example ten seconds. As another example, each mote or indicator may include a button or switch that the agent may manually operate to deactivate the indicator after placement of the item in the receptacle. As yet another example, the agent may select an item on a communication device carried by the agent to indicate that the item has been picked and placed in the receptacle; the communication device may then send a request message to the mote to deactivate the indicator, or alternatively the communication device may send a message to the control system indicating that the item has been picked and placed in the indicated receptacle. The control system may then send a request message to the mote to deactivate the receptacle.

As indicated at 414, if there are more items on the list of items to be picked, the agent may repeat 404 through 412 for each remaining item. If all items on the list of items have been picked, then the completed receptacles may be delivered to their assigned destinations in the materials handling facility using one of the methods previously described. After delivering the completed receptacles, the agent may obtain a new list of items and destinations and perform another pick session for multiple destinations.

Note that, in one embodiment, the receptacles with motes as described herein may be mobile and dynamically configurable. In one embodiment, there is no fixed number of receptacles that an agent can use in a pick session; different pick sessions may use different numbers of receptacles, assigned to different numbers of destinations. The agent may be directed to take two receptacles on one pick session; five receptacles on a next pick session, etc. In one embodiment, the agent may scan or otherwise enter the receptacles selected for a pick session so that the control system knows which receptacles are on the cart for a particular session, or even the order or arrangement of the receptacles on the cart. The control system decides which receptacles go to which destinations. The system is dynamic as to configuring destinations for a pick session and mapping the destinations to receptacles. In one embodiment, an agent may choose how many receptacles and/or destinations to work on in one pick session, and the control system may adjust dynamically to this constraint provided by the agent by assigning the requested number of receptacles or destinations that the agent is to pick to in the pick session.

Since the receptacles with motes may not be in a fixed position, some embodiments may provide a mechanism to dynamically determine where the motes on receptacles are in the materials handling facility and/or on a cart. In one embodiment, motes may be configured to detect what their relative position in relation to other motes on receptacles by communicating among themselves, or their relative position in the materials handling facility by communicating with other motes or other fixed and/or mobile devices in the facility.

It may be advantageous for the control system to know where on a cart each receptacle is placed, e.g. on a top or bottom shelf, or a specific location on a shelf. Knowing where receptacles are on a cart may allow the control system to assign destinations to particular receptacles in particular locations on the cart, for example to assign destinations for which a large number of items are to be picked to receptacles that are in more convenient locations on the cart. To determine the relative position of receptacles on a cart, in one embodiment, the receptacles may be scanned when placed on the cart in some sort of order, for example left to right, top to bottom. Alternatively, there may be motes and/or sensors on the cart that are configured to detect when a receptacle is placed on the cart, and to determine the location of the receptacle on the cart. The control system then knows what and how many receptacles are on the cart, and the position of each receptacle on the cart, and can use this information to assign destinations to the receptacles. In one embodiment, the control system may select one receptacle for the first item picked for a first location, and then select another empty receptacle when a first item is picked for another destination. The selection of receptacles for destinations may be performed randomly, in the order of the receptacles on the cart (e.g. left to right, top to bottom) or, alternatively, in some order to optimize the picking and placing of items into the receptacles on the cart.

Figure 12:
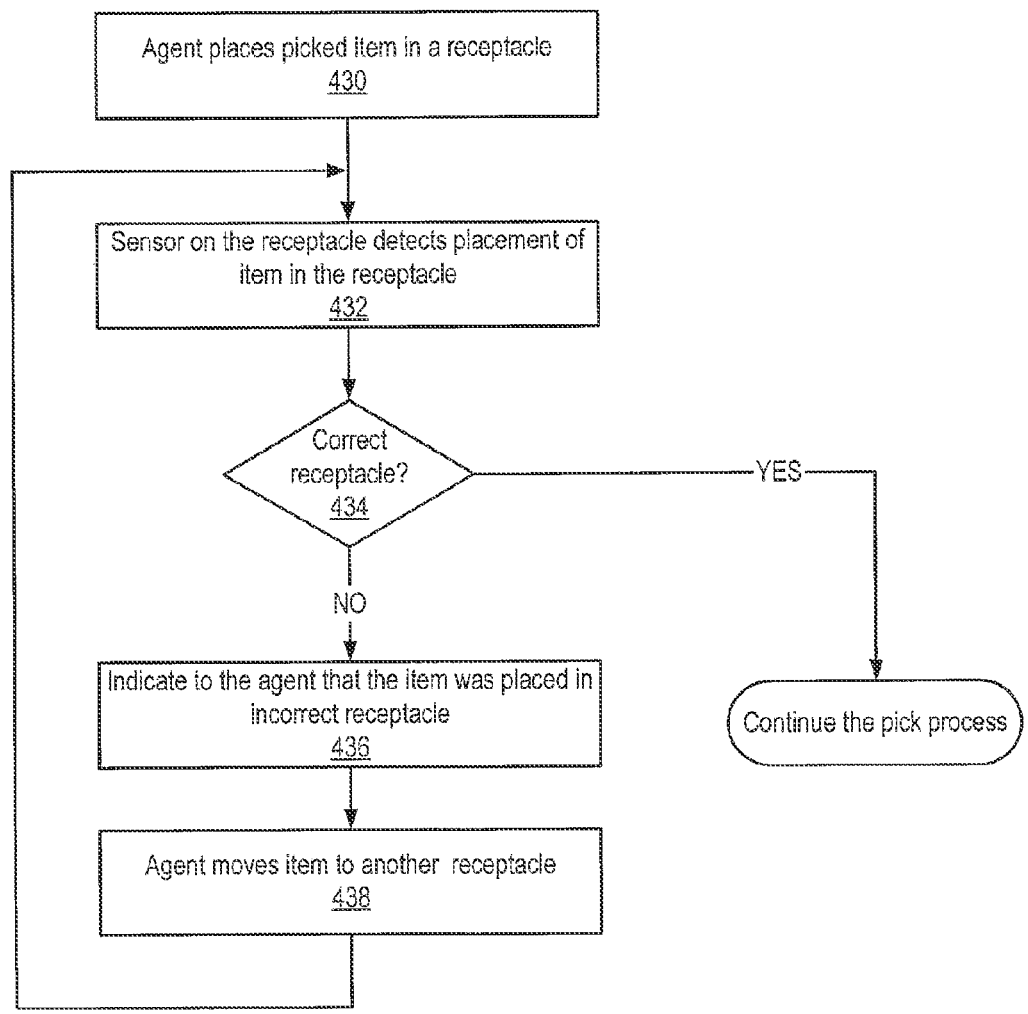
FIG. 12 is a flowchart of a method for detecting and correcting errors in placing items in destination receptacles according to one embodiment.

FIG. 12 is a flowchart of a method for detecting and correcting errors in placing items in destination receptacles according to one embodiment. As indicated at 430, an agent places a picked item in one of two or more receptacles. In one embodiment, the mote may include an indicator coupled to the mote, and the indicator on the correct destination receptacle may have been previously activated to indicate to the agent that the receptacle is the destination receptacle for the item. In another embodiment, there may be a sensor but not an indicator on the receptacle. In this embodiment, some other method may be used to indicate to the agent which receptacle is the destination receptacle for the item. For example, the destination receptacle may be indicated to the agent on a communications device carried by the agent. Other embodiments may use other methods to indicate to the agent which receptacle is the destination receptacle for the item.

A sensor on the receptacle, such as a motion detector, may sense the item being placed in the receptacle, as indicated at 432. This information may be sent to the control system and/or to the communication device carried by the agent. As indicated at 434, if the receptacle that detected placement of the item is the correct receptacle, then the pick process may continue. If the receptacle that detected placement of the item is not the correct receptacle, an indication may be provided to the agent to inform the agent that the item was placed in the incorrect receptacle as indicated at 436. In embodiments, this indication, as previously described, may be a light or other visual indication on the receptacle; a text message displayed on the receptacle, on the agent's communication device, or on some other device; an audible tone or message from the receptacle, the agent's communication device, or some other device; or some other indication, as previously described. Note that the indication may remain active until placement of the item in the correct receptacle is detected, or may be reactivated after incorrect placement of the item is detected, if previously deactivated. The agent may then take corrective action to move the item to the destination receptacle for the item, as indicated at 438. Again, the sensor on the receptacle the item is placed in may detect the placement of the item, and thus 432 through 436 may be repeated one or more times until the item is placed in the correct receptacle.

Figure 13:
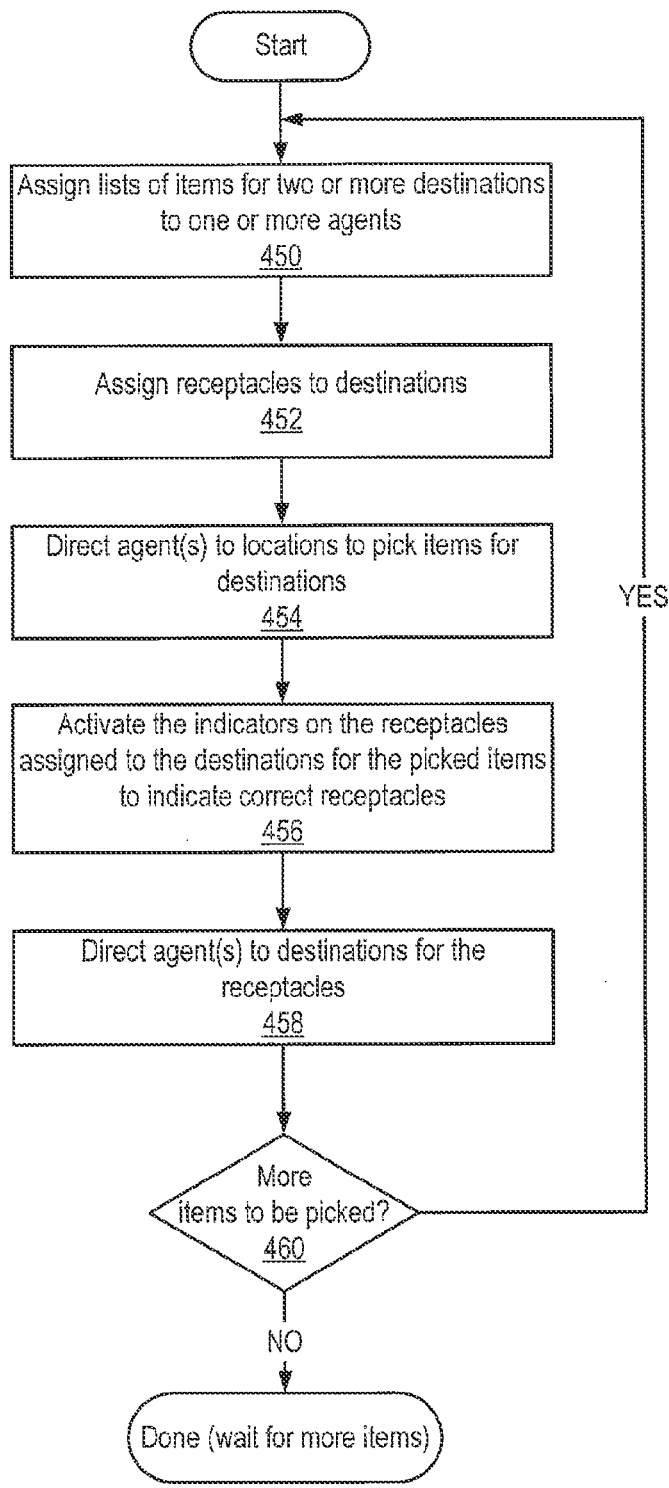
FIG. 13 is a system-level flowchart of a control system directing one or more agents in picking items for multiple destinations according to one embodiment.

FIG. 13 is a system-level flowchart of a control system directing one or more agents in picking items for multiple destinations according to one embodiment. As indicated at 450, a control system, such as control system 190 of FIG. 9, may assign lists of items for two or more destinations to one or more agents of the materials handling facility. Each agent may then obtain, or alternatively reuse, receptacles for the destinations. The control system may assign the receptacles obtained by each agent to the destinations assigned to the agents, as indicated at 452.

The control system may then direct the agent(s) to locations in the materials handling facility to pick the items for the destinations, as indicated at 454. At the locations, the agents may pick items as specified by the control system. Each picked item may be scanned or otherwise entered on a communication device carried by the agent, or the agent may activate a button or other mechanism on the communication device, to indicate to the control system that the item was picked. Alternatively, a mote coupled to the cart may detect the item when the item is brought into range of the cart and relay information about the item to the control system. The control system may then activate the indicator coupled to a mote on a receptacle assigned to the destination for the picked item to indicate to the agent that the receptacle is the correct receptacle to place the item in, as indicated at 456. In one embodiment, each receptacle may include some sensing device, such as a motion detector or light curtain, to detect placement of an item in the receptacle. In this embodiment, placement of an item in the correct or in an incorrect receptacle may be indicated to the agent via the mote and indicator on the receptacle, as previously described.

When an agent has completed picking of all items for all destinations assigned to the agent, the agent may then deliver the receptacles to their destination(s). The control system may direct the agent(s) to the destinations for the receptacles, as indicated at 458. In one embodiment, the control system may detect when a receptacle is proximate to a destination, and may activate the indicator on the receptacle to indicate to the agent that the receptacle is to be dropped off at the destination. At 460, if there are more items to be picked, the agent may then be assigned one or more new lists of items for one or more destinations to begin a new picking session. If there are currently no more items to be picked, then the control system may wait for more orders or requests for items to be picked, which may then be assigned to agents for picking.

Note that the above process may be directed by the control system for two or more agents simultaneously. In some embodiments, the control system may include mechanisms to utilize the ability of agents to pick for two or more destinations in each pick session provided by the motes on receptacles as described herein to increase pick density (e.g., to minimize the distance traveled by agents, and thus time, in picking items from inventory). The control system may select two or more destinations and a picking path for the assigned items for each agent and direct the agents along the picking paths to pick the items, and may then direct the agent in delivering the completed receptacles to the destinations along a minimal path. Since each agent can pick to multiple destinations, instead of to just one destination, the control system may assign destinations to and arrange the picking path for the agent so that the agent can pick more items in one pass along a path through the inventory than in conventional pick methods where the agent is limited to picking to one destination at a time. The control system may attempt to minimize the path traveled by each agent in the materials handling facility for each pick session by assigning to an agent two or more lists of items for destinations that include items along the same or similar path. As previously noted, in one embodiment, a destination for a receptacle may be another picking agent as directed by the control system, who may then continue picking items in the receptacle, which may provide improved picking efficiency by allowing agents to pick in assigned regions of the materials handling facility.

Figure 14:
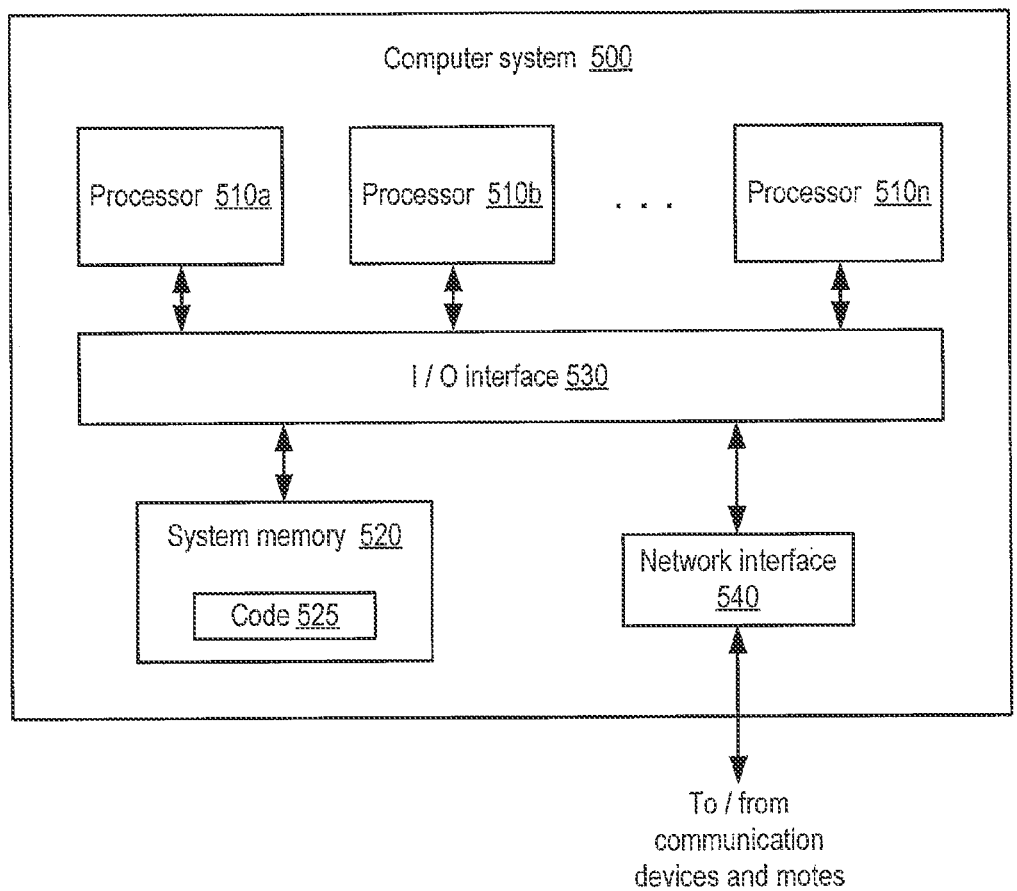
FIG. 14 is a block diagram illustrating an exemplary embodiment of a computer system.

In one embodiment, a materials handling facility control system, such as control system 190 illustrated in FIG. 9, may include a general-purpose computer system that includes or is configured to access one or more computer-accessible media, such as computer system 500 illustrated in FIG. 14. In the illustrated embodiment, computer system 500 includes one or more processors 510 coupled to a system memory 520 via an input/output (I/O) interface 530. Computer system 500 further includes a network interface 540 coupled to I/O interface 530. In some embodiments, computer system 500 may be illustrative of control system 190, while in other embodiments control system 190 may include elements in addition to computer system 500.

In various embodiments, computer system 500 may be a uniprocessor system including one processor 510, or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA.

System memory 520 may be configured to store instructions and data accessible by process 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a materials handling facility control system, are shown stored within system memory 520 as code 525.

In one embodiment, I/O interface 530 may be configured to coordinate I/O traffic between processor 510, system memory 520, and any peripheral devices in the device, including network interface 540 or other peripheral interfaces. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices on a network, such as other computer systems, for example. In particular, network interface 540 may be configured to allow communication between computer system 500 and the various communication devices 144 and motes 100 described above. Network interface 540 may commonly support one or more wireless networking protocols (e.g., Wi-Fi/IEEE 802.11, or another wireless networking standard). However, in various embodiments, network interface 540 may support communication via any suitable wired or wireless general data networks, such as other types of Ethernet network, for example. Additionally, network interface 540 may support communication via telecommunications/telephony networks such as analog voice networks or digital fiber communications networks, via storage area networks such as Fibre Channel SANs, or via any other suitable type of network and/or protocol.

In some embodiments, system memory 520 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 500 via I/O interface 530. A computer-accessible medium may also include any volatile or non-volatile media such as RAM (e.g. SDRAM, DDR SDRAM, RDRAM, SRAM, etc.), ROM, etc, that may be included in some embodiments of computer system 500 as system memory 520 or another type of memory. Further, a computer-accessible medium may include transmission media or signals such as electrical, electromagnetic, or digital signals, conveyed via a communication medium such as a network and/or a wireless link, such as may be implemented via network interface 540.

In one embodiment, the relationship between a control system 190 and communication devices 144 may be a server/client type of relationship. For example, control system 190 may be configured as a server computer system 500 that may convey instructions to and receive acknowledgements from communication devices 144 and receptacles 100. In such an embodiment, communication devices 144 may be relatively simple or "thin" client devices. For example, communication devices 144 may be configured as dumb terminals with display, data entry and communications capabilities, but otherwise little computational functionality. However, it is contemplated that in some embodiments, communication devices 144 may be computer systems configured similarly to computer system 500, including one or more processors 510 and various other devices (though in some embodiments, a computer system 500 implementing a communication device 144 may have somewhat different devices, or different classes of devices, compared to a computer system 500 implementing control system 190). It is further contemplated that in some embodiments, the functionality of control system 190 may be distributed across some or all of communication devices 144 and/or receptacles 100. That is, in some embodiments, there may be no centralized point of control of the activity of order fulfillment center agents; rather, communication devices 144, receptacles 100, and other devices may function in a cooperative, distributed fashion to coordinate the activities of the order fulfillment center.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. An apparatus for receiving and transporting items picked from a materials handling facility to one of a plurality of destinations in the materials handling facility, the apparatus comprising:
   a receptacle configured to hold the items; and
   a mote, comprising:
      a mote core comprising:
         a processor;
         a memory; and
         a communications interface;
      an indicator coupled to the mote core;
      wherein the mote is configured to communicate with a materials handling facility control system to activate said indicator to indicate to an agent of the materials handling facility that N item is to be placed into the receptacle; and
   a sensor communicatively coupled to the mote, wherein the sensor is configured to read information from the item that identifies the item that has been placed into the receptacle;
   wherein the mote is configured to communicate with the materials handling facility control system to send a signal that includes information uniquely identifying the receptacle corresponding to the sensor, or information that identifies the item that has been placed into the receptacle.

2. The apparatus as recited in claim 1, wherein the sensor is further configured to detect placement of the item in the receptacle.

3. The apparatus as recited in claim 1, wherein the one of the plurality of destinations is a sorting station, packing station, or a station for performing value-added services.

4. The apparatus as recited in claim 1, wherein the indicator comprises a light, wherein said activating the indicator comprises activating the light.

5. The apparatus as recited in claim 1, wherein the sensor is configured to detect placement of a picked item into the receptacle, and wherein the mote is configured to communicate with the materials handling facility control system to send a signal in response to the sensor detecting placement of the picked item into the receptacle.

6. The apparatus as recited in claim 1, wherein the receptacle is one of a tote, a basket, a box, a bin, a hopper, a shelf, or an induct lane of an automated sorting mechanism.

7. A mote coupled to a portable receptacle, the mote comprising:
   a mote core comprising:
      a processor;
      a memory; and
      a wireless communications interface;
   an indicator coupled to the mote core;
   wherein the mote is configured to:
      receive, via the wireless communications interface, a message with instructions to activate the indicator coupled to the mote core to indicate to an agent that an item is to be placed into the portable receptacle; and
      in response to the received message, activate the indicator; and
   a sensor communicatively coupled to the mote core, wherein the sensor is configured to read information from the item that has been placed into the portable receptacle;
   wherein the mote is configured to send a signal over the wireless communication interface that includes information uniquely identifying the receptacle corresponding to the sensor, or information that identifies the item that has been placed into the portable receptacle.

8. The mote of claim 7, wherein the indicator comprises a light, and wherein said activating the indicator comprises activating the light.

9. The mote of claim 7,
   wherein the sensor is configured to detect placement of the item in the portable receptacle;
   wherein the mote is further configured to:
      send, via the wireless communications interface, a signal to a control system in response to the sensor detecting placement of the item into the portable receptacle, wherein the signal includes information that uniquely identifies the portable receptacle corresponding to the sensor; and
      deactivate the activated indicator in response to receipt of an instruction from the control system, wherein the instruction from the control system is based, at least in part, on the information that uniquely identifies the portable receptacle corresponding to the sensor.

10. The mote of claim 9,
    wherein the instruction from the control system is further based, at least in part, on the information identifying the item placed into the portable receptacle.

11. The mote of claim 7, wherein the indicator comprises a light, and wherein said activation of the indicator comprises activation of the light, the mote further configured to:
  receive an indication that the item was placed in an incorrect receptacle; and
  instruct further activation of the indicator or activation of another indicator to indicate that the item was placed in the incorrect receptacle, further activation comprising activation of flashing, activation of a different color, or display of a text message.

12. The mote of claim 7, wherein the portable receptacle is a compartment in one of a partitioned tote, a partitioned basket, a partitioned box, a partitioned bin, or a partitioned shelf.

13. A mote, comprising:
  a mote core comprising:
    a processor;
    a memory; and
    a wireless communications interface;
  an indicator coupled to the mote core;
  a sensor communicatively coupled to the mote core, wherein the sensor is configured to read information from an item that identifies the item that has been placed into a receptacle;
  wherein the mote is configured to communicate with a control system via the wireless communications interface to activate said indicator to indicate to an agent that the item is to be placed in the receptacle;
  wherein the mote is configured to communicate with a control system via the wireless communications interface to send a signal that includes information uniquely identifying the receptacle corresponding to the sensor, or information that identifies the item that has been placed into the receptacle.

14. The mote as recited in claim 13, wherein the mote is further configured to deactivate the activated indicator in response to receiving an instruction from the control system, wherein the instruction from the control system is based, at least in part, on the information uniquely identifying the receptacle corresponding to the sensor.

15. The mote as recited in claim 14,
  wherein the instruction from the control system is further based, at least in part, on the information that identifies the item placed into the receptacle.

16. The mote as recited in claim 13, wherein the indicator comprises a light, wherein said activating the indicator comprises activating the light, and wherein the mote is further configured to:
  receive an indication that the item was placed in an incorrect receptacle; and
  instruct, responsive to the received indication, further activation of the indicator or activation of another indicator to indicate that the item was placed in the incorrect receptacle, further activation comprising activation of flashing of the indicator, activation of a different color of the indicator, or display of a text message.

17. The mote as recited in claim 13, wherein the receptacle is a compartment in one of a partitioned tote, a partitioned basket, a partitioned box, a partitioned bin, or a partitioned shelf.

* * * * *